United States Patent
Nariyama

(10) Patent No.: US 11,094,957 B2
(45) Date of Patent: Aug. 17, 2021

(54) FLOW BATTERY

(71) Applicant: Panasonic Intellectual Property Management Co., Ltd., Osaka (JP)

(72) Inventor: Honami Nariyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 205 days.

(21) Appl. No.: 16/550,172

(22) Filed: Aug. 23, 2019

(65) Prior Publication Data

US 2019/0379080 A1 Dec. 12, 2019

Related U.S. Application Data

(63) Continuation of application No. PCT/JP2019/005064, filed on Feb. 13, 2019.

(30) Foreign Application Priority Data

Apr. 6, 2018 (JP) .............................. JP2018-073868

(51) Int. Cl.
    *H01M 8/18* (2006.01)
(52) U.S. Cl.
    CPC .................................. *H01M 8/188* (2013.01)
(58) Field of Classification Search
    CPC .................................................. H01M 8/188
    USPC ......................................................... 429/105
    See application file for complete search history.

(56) References Cited

U.S. PATENT DOCUMENTS

| | | | |
|---|---|---|---|
| 2007/0178370 A1 | 8/2007 | Amine et al. | |
| 2014/0178735 A1 | 6/2014 | Wang et al. | |
| 2014/0302386 A1* | 10/2014 | Gaubicher | H01M 10/0567 429/188 |
| 2014/0370405 A1* | 12/2014 | Zhang | H01M 8/188 429/418 |
| 2015/0236543 A1* | 8/2015 | Brushett | H01M 8/188 429/81 |
| 2018/0026256 A1* | 1/2018 | Inoue | H01M 50/578 429/61 |
| 2018/0048004 A1 | 2/2018 | Hojo | |

(Continued)

FOREIGN PATENT DOCUMENTS

| CN | 101577348 A | 11/2009 |
|---|---|---|
| JP | 2014-524124 | 9/2014 |

(Continued)

OTHER PUBLICATIONS

International Search Report of PCT application No. PCT/JP2019/005064 dated Mar. 19, 2019.

(Continued)

*Primary Examiner* — James M Erwin
(74) *Attorney, Agent, or Firm* — McDermott Will and Emery LLP

(57) ABSTRACT

A flow battery includes a first liquid containing a first electrode mediator, a first electrode, a first active material, and a first circulator that circulates the first liquid between the first electrode and the first active material. The first electrode mediator includes at least one benzene derivative that is at least one selected from the group consisting of 1,4-di-tert-butyl-2,5-dimethoxybenzene, 1,4-dichloro-2,5-dimethoxybenzene, 1,4-difluoro-2,5-dimethoxybenzene, and 1,4-dibromo-2,5-dimethoxybenzene.

13 Claims, 6 Drawing Sheets

(56) References Cited

U.S. PATENT DOCUMENTS

2018/0248218 A1* 8/2018 Zhang .................... H01M 8/20
2019/0058208 A1 2/2019 Fujimoto et al.

FOREIGN PATENT DOCUMENTS

WO 2016/208123 12/2016
WO 2018/016249 1/2018

OTHER PUBLICATIONS

Jinhua Huang et al., "A subtractive approach to molecular engineering of dimethoxybenzene-based redox materials for non-aqueous flow batteries", Journal of Materials Chemistry A, 2012, Jun. 18, 2015.

Jingjing Zhang et al., "Annulated Dialkoxybenzenes as Catholyte Materials for Non-aqueous Redox Flow Batteries: Achieving High Chemical Stability through Bicyclic Substitution", Advanced Energy Materials, 2017, 7, 1701272, pp. 1-5, Jul. 21, 2017.

The Extended European Search Report dated May 14, 2021 for the related European Patent Application No. 19759484.9.

* cited by examiner

FLOW BATTERY

BACKGROUND

1. Technical Field

The present disclosure relates to a flow battery.

2. Description of the Related Art

Japanese Unexamined Patent Application Publication (Translation of PCT Application) No. 2014-524124 discloses a redox flow battery system including an energy reservoir that contains a redox mediator. International Publication No. WO2016/208123 discloses a flow battery that uses redox species.

SUMMARY

It is desirable to realize a flow battery that uses a high-potential solid positive electrode active material and therefore has a high discharge potential.

In one general aspect, the techniques disclosed here feature a flow battery that includes a first liquid containing a first electrode mediator, a first electrode, a first active material, and a first circulator that circulates the first liquid between the first electrode and the first active material, wherein the first electrode mediator includes at least one benzene derivative that contains at least a pair of alkoxy groups located at para positions relative to each other.

Aspects of the present disclosure realize flow batteries that use a high-potential positive electrode active material.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
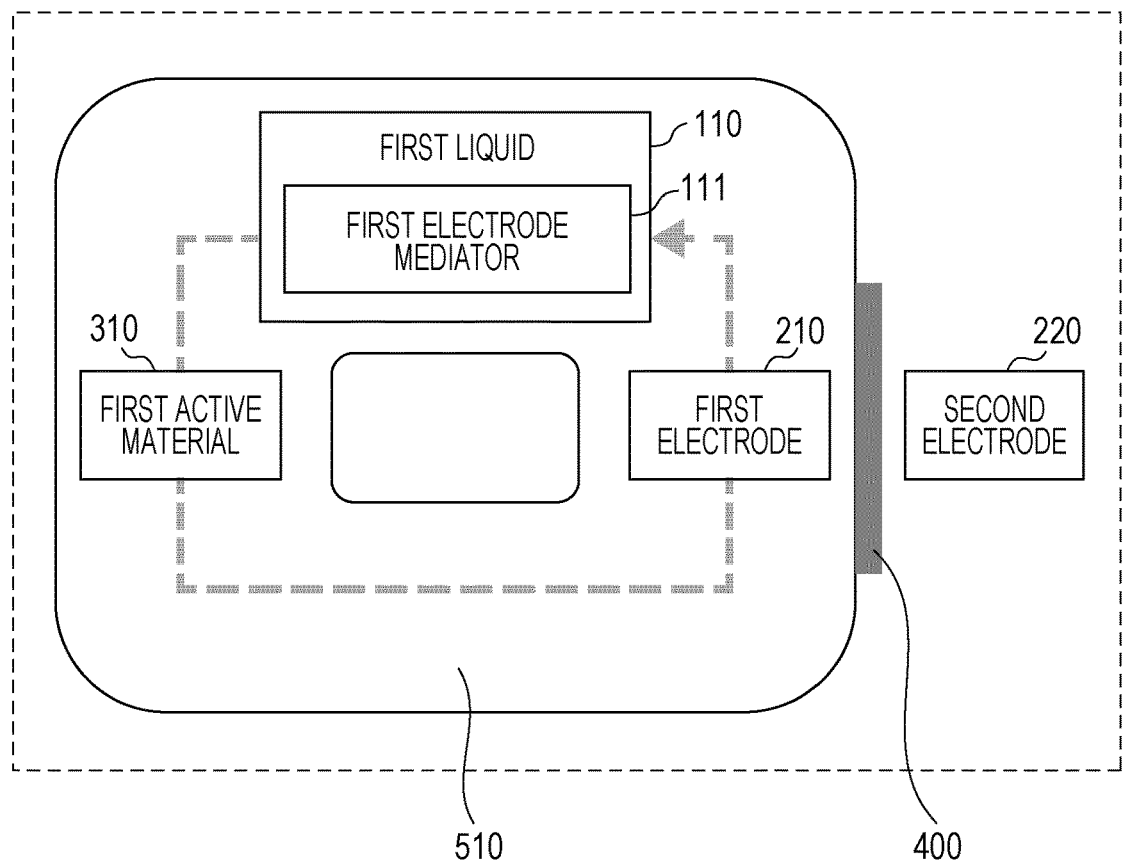
FIG. 1 is a block diagram illustrating a general configuration of a flow battery of a first embodiment.

Overview of One Aspect According to Present Disclosure

A first aspect of the present disclosure provides a flow battery including:

a first liquid containing a first electrode mediator;
a first electrode;
a first active material; and
a first circulator that circulates the first liquid between the first electrode and the first active material,
wherein the first electrode mediator includes at least one benzene derivative that contains at least a pair of alkoxy groups located at para positions relative to each other.

In a second aspect of the present disclosure, the flow battery according to the first aspect is as follows, for example: the at least one benzene derivative contains at least one atom or at least one substituent group located at at least one position other than the para positions at which the alkoxy groups are present, the at least one atom not being a hydrogen atom.

In a third aspect of the present disclosure, the flow battery according to the first or second aspect is as follows, for example: the at least one benzene derivative is a benzene derivative represented by general formula (1) below.

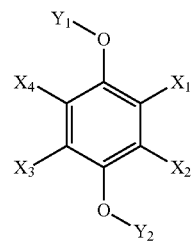

(1)

In the formula, $X_1$ to $X_4$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof, and $X_1$, $X_2$, $X_3$, and $X_4$ are not simultaneously hydrogen. Furthermore, $Y_1$ and $Y_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, and combinations thereof.

In a fourth aspect of the present disclosure, the flow battery according to any one of the first to third aspects is as follows, for example: the at least one benzene derivative is a benzene derivative represented by general formula (2) below.

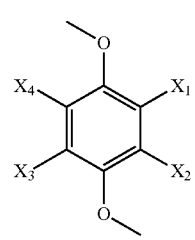

(2)

In the formula, $X_1$ to $X_4$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof, and $X_1$, $X_2$, $X_3$, and $X_4$ are not simultaneously hydrogen.

In a fifth aspect of the present disclosure, the flow battery according to any one of the first to third aspects is as follows, for example: the at least one benzene derivative is a benzene derivative represented by general formula (3) below.

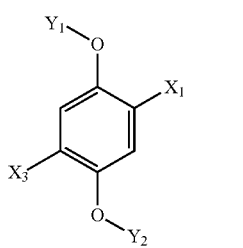

(3)

In the formula, $X_1$ and $X_3$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof, and $X_1$ and $X_3$ are not simultaneously hydrogen. Furthermore, $Y_1$ and $Y_2$ are each independently at least one selected from the group consisting of chain saturated hydrocarbon groups, chain unsaturated hydrocarbon groups, cyclic saturated hydrocarbon groups, cyclic unsaturated hydrocarbon groups, and combinations thereof.

In a sixth aspect of the present disclosure, the flow battery according to any one of the first to third aspects is as follows, for example: the at least one benzene derivative is a benzene derivative represented by general formula (4) below.

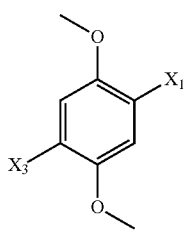

(4)

In the formula, $X_1$ and $X_3$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof, and $X_1$ and $X_3$ are not simultaneously hydrogen.

In a seventh aspect of the present disclosure, the flow battery according to any one of the first to sixth aspects is as follows, for example: the at least one benzene derivative is at least one selected from the group consisting of 1,4-di-tert-butyl-2,5-dimethoxybenzene, 1,4-dichloro-2,5-dimethoxybenzene, 1,4-difluoro-2,5-dimethoxybenzene, and 1,4-dibromo-2,5-dimethoxybenzene.

In an eighth aspect of the present disclosure, the flow battery according to any one of the first to seventh aspects is as follows, for example:

the at least one benzene derivative has a first redox potential and a second redox potential, and an equilibrium potential of the first active material is higher than the first redox potential and lower than the second redox potential.

In a ninth aspect of the present disclosure, the flow battery according to any one of the first to eighth aspects is as follows, for example:

the first liquid further contains a first-electrode-side discharge mediator, the at least one benzene derivative has an oxidation potential, an equilibrium potential of the first active material is lower than the oxidation potential of the at least one benzene derivative, and the equilibrium potential of the first active material is higher than an equilibrium potential of the first-electrode-side discharge mediator.

In a tenth aspect of the present disclosure, the flow battery according to any one of the first to ninth aspects is as follows, for example:

the first circulator includes a first container, the first active material and the first liquid are stored in the first container, the first circulator circulates the first liquid between the first electrode and the first container, and contact of the first liquid with the first active material in the first container causes at least one of an oxidation reaction of the first electrode mediator due to the first active material and a reduction reaction of the first electrode mediator due to the first active material.

In an eleventh aspect of the present disclosure, the flow battery according to any one of the first to tenth aspects is as follows, for example:

the first circulator includes a first passage-inhibiting filter that inhibits passage of the first active material, and the first passage-inhibiting filter is disposed in a path along which the first liquid flows from the first container to the first electrode.

In a twelfth aspect of the present disclosure, the flow battery according to any one of the first to eleventh aspects is as follows, for example: the flow battery further includes:

a second liquid containing a charge mediator and a discharge mediator;

a second electrode immersed in the second liquid;

a second active material immersed in the second liquid; and a separator that separates the first electrode and the first liquid from the second electrode and the second liquid, wherein an equilibrium potential of the charge mediator is lower than an equilibrium potential of the second active material, and an equilibrium potential of the discharge mediator is higher than the equilibrium potential of the second active material.

In a thirteenth aspect of the present disclosure, the flow battery according to the twelfth aspect is as follows, for example:

the second liquid contains lithium dissolved in the second liquid, the second active material is a material having a property of occluding and releasing the lithium, during charging, the charge mediator is reduced on the second electrode, and also, the charge mediator reduced on the second electrode is oxidized by the second active material, and the second active material occludes the lithium, and during discharging, the second active material containing the lithium occluded in the second active material reduces the discharge mediator and releases the lithium, and also, the discharge mediator reduced by the second active material is oxidized on the second electrode.

In a fourteenth aspect of the present disclosure, the flow battery according to the twelfth aspect is as follows, for example:

during the charging, the discharge mediator is reduced on the second electrode, and during the discharging, the charge mediator is oxidized on the second electrode.

In a fifteenth aspect of the present disclosure, the flow battery according to any one of the twelfth to fourteenth aspects is as follows, for example:

the charge mediator and the discharge mediator include condensed aromatic compounds, and the second liquid, in which the condensed aromatic compounds are dissolved, has a property that allows electrons of lithium that are to be solvated to be released into the second liquid and allows the lithium to be dissolved as cations in the second liquid.

In a sixteenth aspect of the present disclosure, the flow battery according to any one of the twelfth to fifteenth aspects is as follows, for example:

the charge mediator includes at least one selected from the group consisting of phenanthrene, biphenyl, o-terphenyl, triphenylene, and anthracene.

In a seventeenth aspect of the present disclosure, the flow battery according to any one of the twelfth to sixteenth aspects is as follows, for example:

the discharge mediator includes at least one selected from the group consisting of phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, and ethylenediamine.

In an eighteenth aspect of the present disclosure, the flow battery according to any one of the twelfth to seventeenth aspects is as follows, for example:

the flow battery further includes a second circulator including a second container, wherein the second active material and the second liquid are stored in the second container, the second circulator circulates the second liquid between the second electrode and the second container, and contact of the second liquid with the second active material in the second container causes at least one of an oxidation reaction of the charge mediator due to the second active material and a reduction reaction of the discharge mediator due to the second active material.

In a nineteenth aspect of the present disclosure, the flow battery according to any one of the twelfth to eighteenth aspects is as follows, for example:

the second circulator includes a second passage-inhibiting filter that inhibits passage of the second active material, and the second passage-inhibiting filter is disposed in a path along which the second liquid flows from the second container to the second electrode.

In the flow batteries according to the first to nineteenth aspects described above, the presence of the lone pairs of the alkoxy groups, which are attached at para positions relative to each other, provides an electron-donating conjugation effect, and therefore, the benzene derivative cation radicals are stabilized to carry out reversible charging and discharging. Hence, flow batteries having a higher discharge potential are realized.

Embodiments of the present disclosure will now be described with reference to the drawings.

First Embodiment

FIG. 1 is a block diagram illustrating a general configuration of a flow battery 1000 of a first embodiment.

The flow battery 1000 of the first embodiment includes a first liquid 110, a first electrode 210, a first active material 310, and a first circulator 510.

The first liquid 110 is a liquid in which a first electrode mediator 111 is dissolved.

The first electrode 210 is an electrode immersed in the first liquid 110.

The first active material 310 is an active material immersed in the first liquid 110.

The first circulator 510 is a mechanism that circulates the first liquid 110 between the first electrode 210 and the first active material 310.

The first electrode mediator 111 includes a benzene derivative that contains at least a pair of alkoxy groups located at para positions relative to each other. Alternatively, the first electrode mediator 111 may contain at least a pair of alkoxy groups located at para positions relative to each other and contain at least one atom or substituent group located at at least one position other than the para positions, the at least one atom not being a hydrogen atom.

Figure 5:
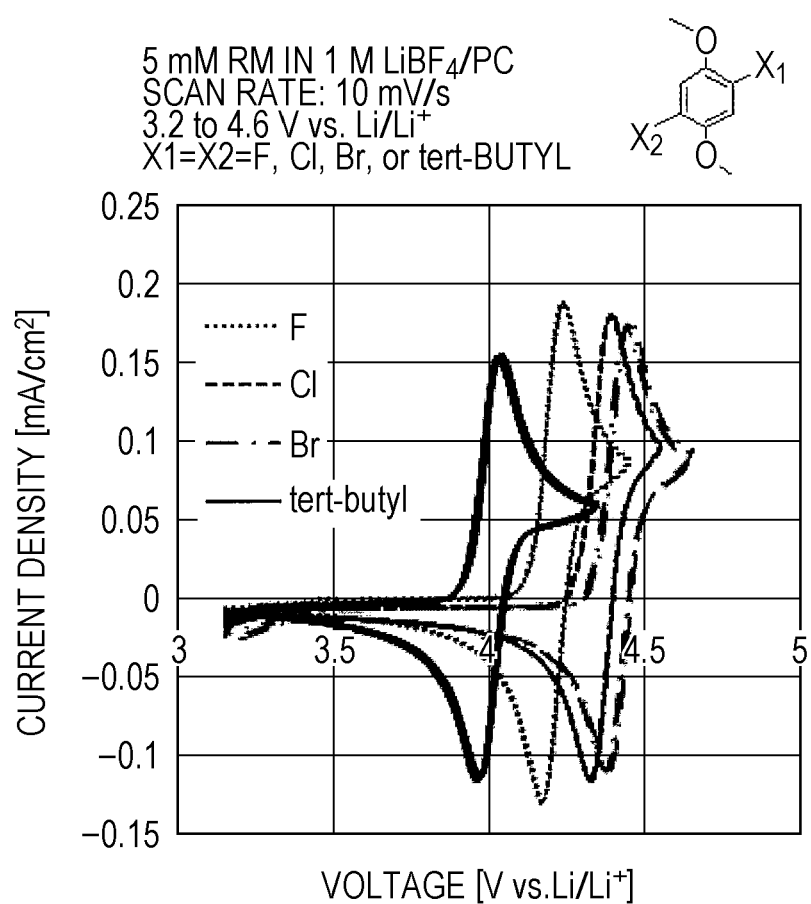
FIG. 5 is a graph illustrating the results of cyclic voltammetry of Example.

When electrochemically oxidized, many benzene derivatives undergo, for example, oxidative decomposition or a polymerization reaction and, therefore, cannot undergo reversible redox reactions. However, in the case of derivatives containing, for example, an alkoxy group, electrons lost in electrochemical oxidation can be compensated for by electrons from a lone-pair-bearing atom, such as oxygen, present in the substituent group. In addition, when the attachment positions of the substituent group are para positions as illustrated in FIG. 5, the symmetry of the molecule is improved, which stabilizes the cation, and as a result, a stable single-step redox reaction occurs. In addition, in each of the cases, the stronger the electron-withdrawing property of the substituent group, the higher the reaction potential.

The configuration described above realizes a flow battery having a high discharge potential, a high energy density, and a long cycle life. That is, in the configuration described above, the benzene derivative has a redox potential of approximately 4 V and therefore can be used as a charge mediator for $LiCoO_2$, $LiNiO_2$, $LiMn_2O_4$, and the like and as a discharge mediator for $LiNi_{0.5}Mn_{1.5}O_4$ and the like. Furthermore, one type of benzene derivative may be used alone.

Hence, an active material having a high equilibrium potential can be used as the first active material 310, and therefore, a flow battery having a higher discharge potential is realized. The active material having a high equilibrium potential may have an equilibrium potential of approximately 3.8 to 4.5 V vs. Li/Li$^+$, for example.

Furthermore, the configuration described above realizes a flow battery with a configuration in which although an active material is utilized, the active material itself is not circulated. Accordingly, for example, a high-capacity powder active material can be used as the first active material 310 for the charge and discharge reactions. Consequently, a high energy density and a high capacity are realized.

Furthermore, the configuration described above makes it possible to circulate, exclusively, the first liquid 110 in which the first electrode mediator 111 is dissolved, without circulating the powder active material itself. As a result, for example, clogging of a conduit or the like due to a powder active material is inhibited from occurring. Hence, a flow battery having a long cycle life is realized.

In the flow battery 1000 of the first embodiment, the benzene derivative may be a benzene derivative represented by general formula (1) below.

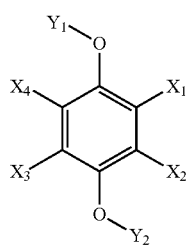

(1)

In the formula, $X_1$ to $X_4$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof. Furthermore, $Y_1$ and $Y_2$ are each independently at least one selected from the group consisting of chain saturated hydrocarbon groups, chain unsaturated hydrocarbon groups, cyclic saturated hydrocarbon groups, cyclic unsaturated hydrocarbon groups, and combinations thereof, and $X_1$, $X_2$, $X_3$, and $X_4$ are not simultaneously hydrogen.

With the configuration described above, a high-potential solid positive electrode active material can be used, and therefore, a flow battery having a high discharge voltage is realized. The chain saturated hydrocarbon group, the chain unsaturated hydrocarbon group, the cyclic saturated hydrocarbon group, and the cyclic unsaturated hydrocarbon group may contain at least one element selected from the group consisting of oxygen, nitrogen, sulfur, and silicon.

In the flow battery 1000 of the first embodiment, in the benzene derivative represented by general formula (1), $R_1$ and $R_2$ may each contain at least one element (non-metallic element) selected from the group consisting of boron, nitrogen, oxygen, fluorine, silicon, phosphorus, sulfur, chlorine, bromine, and iodine. The chain saturated hydrocarbon groups for $X_1$ to $X_4$, $R_1$, $R_2$, $Y_1$, and $Y_2$ may be chain saturated hydrocarbon groups having 1 to 10 carbon atoms. The chain saturated hydrocarbon group having 1 to 10 carbon atoms may be a methyl group, an ethyl group, an n-propyl group, an iso-propyl group, an n-butyl group, an iso-butyl group, an n-pentyl group, an n-hexyl group, an n-heptyl group, an n-octyl group, an n-nonyl group, an n-decyl group, or the like. The chain unsaturated hydrocarbon groups for $X_1$ to $X_4$, $R_1$, $R_2$, $Y_1$, and $Y_2$ may be chain unsaturated hydrocarbon groups having 2 to 6 carbon atoms. The chain unsaturated hydrocarbon group having 2 to 6 carbon atoms may be a vinyl group, a 1-propenyl group, a 2-propenyl group, a 1-methyl-1-ethenyl group, a 1-butenyl group, a 2-butenyl group, a 3-butenyl group, a 2-methyl-1-propenyl group, a 1-ethyl ethenyl group, a 1-methyl-1-propenyl group, a 1-methyl-2-propenyl group, a 1-pentenyl group, a 2-pentenyl group, a 3-pentenyl group, a 4-pentenyl group, a 1-n-propyl ethenyl group, a 1,1-dimethyl-2-propenyl group, a 1-i-propyl ethenyl group, a 1,2-dimethyl-1-propenyl group, a 1-hexenyl group, a 2-hexenyl group, a 3-hexenyl group, a 4-hexenyl group, a 5-hexenyl group, a 1-methyl-1-pentenyl group, or the like. The cyclic saturated hydrocarbon groups for $X_1$ to $X_4$, $R_1$, $R_2$, $Y_1$, and $Y_2$ may be cyclic saturated hydrocarbon groups having 5 to 12 carbon atoms. The cyclic saturated hydrocarbon group having 5 to 12 carbon atoms may each be a cyclopentyl group, a cyclohexyl group, a cycloheptyl group, a cyclooctyl group, a cyclodecyl group, a cycloundecyl group, a cyclododecyl group, or the like. The cyclic unsaturated hydrocarbon groups for $X_1$ to $X_4$, $R_1$, $R_2$, $Y_1$, and $Y_2$ may be cyclic unsaturated hydrocarbon groups having 5 to 12 carbon atoms. The cyclic unsaturated hydrocarbon group having 5 to 12 carbon atoms may be an aliphatic cyclic unsaturated hydrocarbon group with or without a side chain, such as a cyclopentenyl group, a cyclohexenyl group, a cyclooctenyl group, a cycloundecynyl group, a cyclododecynyl group, a cyclohexadienyl group, a cyclooctadienyl group, a cyclododecadienyl group, or a cyclododecatrienyl group; or an aromatic hydrocarbon group with a side chain, such as toluene or xylene. The chain saturated hydrocarbon group, the chain unsaturated hydrocarbon group, the cyclic saturated hydrocarbon group, and the cyclic unsaturated hydrocarbon group may each have an ether bond.

With the configuration described above, the presence of the lone pairs of the alkoxy groups, which are attached at para positions relative to each other, provides an electron-donating conjugation effect, which stabilizes the benzene derivative cation radicals and therefore enables reversible charging and discharging. Hence, a flow battery having a higher discharge potential is realized.

In the flow battery 1000 of the first embodiment, the benzene derivative may be a benzene derivative represented by general formula (2) below.

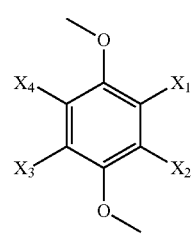

(2)

In the formula, $X_1$ to $X_4$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof, and $X_1$, $X_2$, $X_3$, and $X_4$ are not simultaneously hydrogen. The chain saturated hydrocarbon groups, the chain unsaturated hydrocarbon groups, and the cyclic saturated hydrocarbon groups for $X_1$ to $X_4$, $R_1$, and $R_2$ are the same as those described above with regard to general formula (1).

The configuration described above realizes a flow battery having a higher discharge potential.

In the flow battery 1000 of the first embodiment, the benzene derivative may be a benzene derivative represented by general formula (3) below.

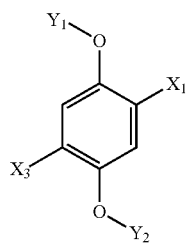

(3)

In the formula, $X_1$ and $X_3$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof, and $X_1$ and $X_3$ are not simultaneously hydrogen. $Y_1$ and $Y_2$ are each independently at least one selected from the group consisting of chain saturated hydrocarbon groups, chain unsaturated hydrocarbon groups, cyclic saturated hydrocarbon groups, cyclic unsaturated hydrocarbon groups, and combinations thereof.

The configuration described above realizes a flow battery having a higher discharge potential.

In the flow battery 1000 of the first embodiment, in the benzene derivative represented by general formula (3), $R_1$ and $R_2$ may each contain at least one element (non-metallic element) selected from the group consisting of boron, nitrogen, oxygen, fluorine, silicon, phosphorus, sulfur, chlorine, bromine, and iodine. The chain saturated hydrocarbon groups, the chain unsaturated hydrocarbon groups, and the cyclic saturated hydrocarbon groups for $X_1$, $X_3$, $R_1$, $R_2$, $Y_1$, and $Y_2$ are the same as those described above with regard to general formula (1).

In the flow battery 1000 of the first embodiment, the benzene derivative may be a benzene derivative represented by general formula (4) below.

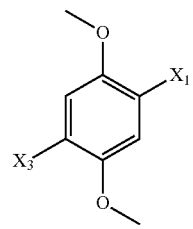

(4)

In the formula, $X_1$ and $X_3$ each independently represent hydrogen, fluorine, chlorine, bromine, a cyano group, a nitro group, a chain saturated hydrocarbon group, a chain unsaturated hydrocarbon group, a cyclic saturated hydrocarbon group, a cyclic unsaturated hydrocarbon group, —$COR_1$, or —$N(R_2)_2$, $R_1$ and $R_2$ are each independently at least one selected from the group consisting of hydrogen, chain saturated hydrocarbon groups, chain unsaturated hydrocarbon groups, cyclic saturated hydrocarbon groups, cyclic unsaturated hydrocarbon groups, cyano groups, nitro groups, and combinations thereof, and $X_1$ and $X_3$ are not simultaneously hydrogen. The chain saturated hydrocarbon groups, the chain unsaturated hydrocarbon groups, and the cyclic saturated hydrocarbon groups for $X_1$, $X_3$, $R_1$, and $R_2$ are the same as those described above with regard to general formula (1).

The configuration described above realizes a flow battery having a higher discharge potential.

In the flow battery 1000 of the first embodiment, the benzene derivative may be at least one selected from the group consisting of 1,4-di-tert-butyl-2,5-dimethoxybenzene, 1,4-dichloro-2,5-dimethoxybenzene, 1,4-difluoro-2,5-dimethoxybenzene, and 1,4-dibromo-2,5-dimethoxybenzene.

The configuration described above realizes a flow battery having a higher discharge potential.

Table 1 below shows the results of a measurement of the potentials of benzene derivatives that may be used as the first electrode mediator 111.

TABLE 1

| Name | Structural formula | Electrolyte solution | Potential [V vs. Li/Li$^+$] Eox1 | Ered1 |
|---|---|---|---|---|
| 1,4-di-tert-butyl-2,5-dimethoxybenzene | | 1M LiBF$_4$/PC | 4.03 | 3.96 |
| 1,4-dichloro-2,5-dimethoxybenzene | | | 4.39 | 4.32 |

TABLE 1-continued

| Name | Structural formula | Electrolyte solution | Potential [V vs. Li/Li$^+$] Eox1 | Potential [V vs. Li/Li$^+$] Ered1 |
|---|---|---|---|---|
| 1,4-difluoro-2,5-dimethoxybenzene | (structure) | | 4.24 | 4.16 |
| 1,4-dibromo-2,5-dimethoxybenzene | (structure) | | 4.44 | 4.37 |

An electrolyte solution in which 1 M of an electrolyte was dissolved in a solvent was prepared. The electrolyte used was LiBF$_4$. The solvent used was propylene carbonate (PC). The combination of the electrolyte and the solvent is shown in Table 1. In the electrolyte solution, 5 mM of each of the benzene derivatives shown in Table 1 was dissolved. Thus, electrolyte solutions corresponding to the respective benzene derivatives shown in Table 1 were obtained. Potential measurement cells corresponding to the respective benzene derivatives shown in Table 1 were prepared. Each of the cells included a corresponding electrolyte solution, a counter electrode, a working electrode, and a reference electrode. For the counter electrode, a 1×1 cm Pt foil was used. For the working electrode, a glassy carbon electrode (6 mm φ) for electrochemical measurement was used. For the reference electrode, silver wire (Ag/Ag$^+$) was used. By using each of the potential measurement cells, the charge and discharge potentials of each of the benzene derivatives shown in Table 1 were measured by cyclic voltammetry (CV). The measured charge and discharge potentials shown in Table 1 are potentials calculated versus lithium metal (V vs. Li/Li$^+$).

Table 1 shows that the benzene derivatives have redox potentials of 4.0 to 4.4 (V vs. Li/Li$^+$). Accordingly, the benzene derivatives can be used as a charge mediator for solid positive electrode active materials having an equilibrium potential lower than a first oxidation potential, which is the charge potential. Furthermore, the benzene derivatives can be used alone as a charge and discharge mediator for solid positive electrode active materials having an equilibrium potential between the first oxidation potential and a first reduction potential which is the discharge potential. In this case, the first-stage oxidation potential (first oxidation potential E$_1$ox (V vs. Li/Li$^+$)) is the charge potential of the mediator, and the first-stage reduction potential (first reduction potential E$_1$red (V vs. Li/Li$^+$)) is the discharge potential of the mediator.

The first redox potentials of 1,4-di-tert-butyl-2,5-dimethoxybenzene, 1,4-dichloro-2,5-dimethoxybenzene, 1,4-difluoro-2,5-dimethoxybenzene, and 1,4-dibromo-2,5-dimethoxybenzene, which are benzene derivatives, are approximately 0.5 V higher than that of tetrathiafulvalene or existing positive electrode discharge mediators.

The discharge potential of a flow battery is determined by the potential of the positive-electrode-side discharge mediator. Hence, with the above-described benzene derivatives of the first embodiment, which have high discharge potentials, a flow battery having a higher discharge potential is realized.

In the flow battery 1000 of the first embodiment, the first electrode mediator 111 may include only one of the above-described benzene derivatives of the first embodiment.

Alternatively, in the flow battery 1000 of the first embodiment, the first electrode mediator 111 may include two or more of the above-described benzene derivatives of the first embodiment.

As described above, the benzene derivatives of the first embodiment have the first oxidation potential E$_1$ox and the first reduction potential E$_1$red.

In this case, the equilibrium potential (V vs. Li/Li$^+$) of the first active material 310 may be lower than the first oxidation potential E$_1$ox and may be higher than the first reduction potential E$_1$red.

With the configuration described above, when an active material having an equilibrium potential higher than the first reduction potential E$_1$red is used as the first active material 310, the benzene derivative of the first embodiment can serve as a discharge mediator. In other words, when an active material that exhibits a potential more noble than the first reduction potential E$_1$red is used as the first active material 310, the benzene derivative of the first embodiment can serve as a discharge mediator. Furthermore, when an active material having an equilibrium potential lower than the first oxidation potential E$_1$ox is used as the first active material 310, the benzene derivative of the first embodiment can serve as a charge mediator. In other words, when an active material that exhibits a potential less noble than the first oxidation potential E$_1$ox is used as the first active material 310, the benzene derivative of the first embodiment can serve as a charge mediator.

In the flow battery 1000 of the first embodiment, the first active material 310 may be a metal oxide represented by Li$_x$M$_y$O$_2$. Here, M is at least one selected from the group consisting of Ni, Mn, and Co, and x and Y are each any number. The metal oxide has an equilibrium potential of 3.8 to 4.4 V.

In the flow battery 1000 of the first embodiment, the first active material 310 may be at least one selected from the group consisting of LiFePO$_4$, LiMnO$_2$, LiMn$_2$O$_4$, and LiCoO$_2$.

LiCoO$_2$ has an equilibrium potential of 3.9 V vs. Li/Li$^+$. Thus, a mediator-type positive electrode using LiCoO$_2$ as an active material can be formed by using a compound having a charge potential more noble than the equilibrium potential of LiCoO$_2$ and having a discharge potential less noble than the equilibrium potential of LiCoO$_2$, as the first electrode mediator 111, which is a charge and discharge mediator. In this case, a smaller potential difference between the equilibrium potential of LiCoO$_2$ and the charge and discharge potentials of the first electrode mediator 111 results in a higher charge and discharge energy efficiency. For example, a discharge potential of the first electrode mediator 111 lower than the equilibrium potential of LiCoO$_2$ and closer to the equilibrium potential of LiCoO$_2$ results in a higher discharge potential of the flow battery. On the other hand, if one type of mediator alone cannot satisfy the conditions, more than one type of mediator need to be used to carry out charging and discharging.

Hence, in the case where LiCoO$_2$ is used as the first active material 310, the discharge potential of the flow battery can be further increased by using at least one benzene derivative as the charge mediator of the first electrode mediator 111 and using, as the discharge mediator, a heteroaromatic compound and a cyclopentadienyl compound that undergo a reversible single- or multi-step redox reaction at 3.78 V vs. Li/Li$^+$. The benzene derivative that serves as the charge mediator may be at least one selected from the group consisting of 1,4-di-tert-butyl-2,5-dimethoxybenzene, 1,4-dichloro-2,5-dimethoxybenzene, 1,4-difluoro-2,5-dimethoxybenzene, and 1,4-dibromo-2,5-dimethoxybenzene. The cyclopentadienyl compound that serves as the discharge mediator may be, for example, 1,1'-dibromoferrocene. In this case, the discharge potential is increased by approximately 0.4 to 0.5 V compared with a case in which LiFePO$_4$, which has a discharge potential of approximately 3.5 V, is used as a solid positive electrode active material.

The benzene derivative may be used as a charge mediator. In this case, a mediator species having a redox potential less noble than the equilibrium potential of the solid positive electrode active material may be used as a discharge mediator.

That is, in the flow battery 1000 of the first embodiment, a first-electrode-side discharge mediator may additionally be dissolved in the first liquid 110. In other words, the first liquid 110 may further include a first-electrode-side discharge mediator.

In this case, the equilibrium potential of the first active material 310 may be lower than the oxidation potential Eox of the benzene derivative.

In addition, the equilibrium potential of the first active material 310 may be higher than the equilibrium potential of the first-electrode-side discharge mediator.

With the configuration described above, when an active material having an equilibrium potential lower than the oxidation potential Eox of the benzene derivative is used as the first active material 310, the benzene derivative of the first embodiment can serve as a charge mediator. In other words, when an active material that exhibits a potential less noble than the oxidation potential Eox is used as the first active material 310, the benzene derivative of the first embodiment can serve as a charge mediator. Furthermore, when an active material having an equilibrium potential higher than the equilibrium potential of the first-electrode-side discharge mediator is used as the first active material 310, the first-electrode-side discharge mediator can serve as a discharge mediator. In other words, when an active material that exhibits a potential less noble than the equilibrium potential of the first-electrode-side discharge mediator is used as the first active material 310, the first-electrode-side discharge mediator can serve as a charge mediator.

The first-electrode-side discharge mediator may be a heteroaromatic compound, such as tetrathiafulvalene or triphenylamine and/or a cyclopentadienyl compound, such as ferrocene.

The benzene derivative may be used as a discharge mediator. In this case, a mediator species having a redox potential more noble than the equilibrium potential of the solid positive electrode active material may be used as a charge mediator.

The first active material 310 may be a solid active material. The solid active material may be an active material in the form of a powder, for example. In the case where the first active material 310 is filled into a tank in the form of a powder without being processed, the manufacturing can be simplified, and the manufacturing cost can be reduced.

The first active material 310 may be an active material in the form of pellets. The active material in the form of pellets may be an active material formed by pelletizing a powder, for example. In the case where the first active material 310 is filled into a tank in the form of pellets, the manufacturing can be simplified, and the manufacturing cost can be reduced.

The first active material 310 may be an active material in the form of pellets bound with a known binder. The binder may be, for example, polyvinylidene fluoride, polypropylene, polyethylene, polyimide, or the like.

The first active material 310 may be a material insoluble in the first liquid 110. This realizes a flow battery with a configuration in which the first electrode mediator 111 is circulated with the first liquid 110 without circulating the first active material 310.

In the flow battery 1000 of the first embodiment, the first liquid 110 may include at least one selected from the group consisting of propylene carbonate (PC), ethylene carbonate (EC), γ-butyrolactone (GBL), dimethyl carbonate (DMC), ethyl methyl carbonate (EMC), fluoroethylene carbonate (FEC), and diethyl carbonate (DEC). The first liquid 110 may include an ether solvent. The ether solvent may be, for example, tetrahydrofuran (THF), 2-methyltetrahydrofuran (2MeTHF), dimethoxyethane (DME), 1,3-dioxane (1,3DO), or 4-methyl-1,3-dioxane (4Me1,3DO).

In the flow battery 1000 of the first embodiment, the first liquid 110 may be an electrolyte-containing electrolyte solution in which the above-described material for the first liquid 110 is used as the solvent. The electrolyte (salt) may be at least one selected from the group consisting of LiBF$_4$, LiPF$_6$, and LiN(CF$_3$SO$_2$)$_2$. The solvent may have a high dielectric constant, have low reactivity with Li ions, and have a potential window of up to approximately 4 V.

In the flow battery 1000 of the first embodiment, the first electrode 210 may be a positive electrode, and the second electrode 220 may be a negative electrode.

The first electrode 210 can be a negative electrode when an electrode having a relatively high potential is used as the second electrode 220.

That is, the first electrode 210 may be a negative electrode, and the second electrode 220 may be a positive electrode.

For example, in the flow battery 1000 of the first embodiment, contact of the first liquid 110 with the first electrode 210 causes the first electrode mediator 111 to be oxidized or reduced by the first electrode 210.

The first electrode 210 may be an electrode having a surface that serves as a reaction site for the first electrode mediator 111.

In this case, a material stable in the first liquid 110 can be used for the first electrode 210. The material stable in the first liquid 110 may be a material insoluble in the first liquid 110, for example. In addition, the material of the first electrode 210 may be stable in the electrochemical reactions that are electrode reactions. For example, a metal, carbon, or the like can be used for the first electrode 210. The metal may be, for example, stainless steel, iron, copper, nickel, or the like.

The first electrode 210 may have a structure with an increased surface area. The electrode having a structure with an increased surface area may be, for example, an electrode made of a mesh material, a nonwoven fabric, a surface-roughened sheet, a sintered porous body, or the like. In this case, the first electrode 210 has a high specific surface area.

As a result, the progress of the oxidation reaction or the reduction reaction of the first electrode mediator 111 can be further facilitated.

The second electrode 220 may be configured to include a current collector and an active material disposed on the current collector. This enables the use of a high-capacity active material, for example. The active material of the second electrode 220 can be a compound having the property of reversibly occluding and releasing lithium ions.

The second electrode 220 may be a lithium metal electrode. The use of a lithium metal electrode as the second electrode 220 facilitates the control of the dissolution and precipitation of the metal positive electrode and realizes high capacity.

The flow battery 1000 of the first embodiment may further include a separator 400.

The separator 400 separates the first electrode 210 and the first liquid 110 from the second electrode 220.

The separator 400 may be a microporous membrane and/or a porous body that may be used in known secondary batteries.

The separator 400 may be a porous membrane formed of, for example, glass paper made of a nonwoven fabric in which glass fibers are incorporated.

The separator 400 may be a separation membrane having ionic conductivity, such as lithium ion conductivity. For example, the separator 400 may be an ion exchange resin membrane, a solid electrolyte membrane, or the like. The ion exchange resin membrane may be, for example, a cation exchange membrane, an anion exchange membrane, or the like.

The first circulator 510 is a mechanism that circulates the first liquid 110 between the first electrode 210 and the first active material 310.

With the configuration described above, the first electrode mediator 111 can be circulated with the first liquid 110 between the first electrode 210 and the first active material 310. This enables the oxidation reaction and the reduction reaction between the materials to be carried out more efficiently.

The first circulator 510 may be a mechanism including, for example, a conduit, a tank, a pump, a valve, and the like.

As a specific example of the first circulator 510, the configuration of a later-described second embodiment, for example, may be mentioned.

Description of Charging and Discharging Processes

Charging and discharging processes for the flow battery 1000 of the first embodiment will be described below.

The charging and discharging processes will be described by specifically exemplifying an operation example, which is configured as described below.

In this operation example, the first electrode 210 is a positive electrode and a carbon black electrode.

In this operation example, the first liquid 110 is an ether solution in which the first electrode mediator 111 is dissolved.

In this operation example, the first electrode mediator 111 includes the above-described benzene derivative (hereinafter referred to as "DAB (dialkoxybenzene)") of the first embodiment.

In this operation example, the first active material 310 is lithium cobalt oxide (LiCoO$_2$).

In this operation example, the second electrode 220 is a negative electrode and a lithium metal electrode.

Description of Charging Process

First, charge reactions will be described.

Charging takes place upon application of a voltage between the first electrode 210 and the second electrode 220.

Reaction on Negative Electrode Side

Upon application of a voltage, electrons are supplied to the second electrode 220, which is the negative electrode, from outside of the flow battery. Accordingly, a reduction reaction occurs at the second electrode 220, which is the negative electrode. That is, the negative electrode is placed in a charge mode.

For example, the following reaction occurs in this operation example.

$$Li^+ + e^- \rightarrow Li$$

Reaction on Positive Electrode Side

Upon application of a voltage, an oxidation reaction of the first electrode mediator 111 occurs at the first electrode 210, which is the positive electrode. That is, the first electrode mediator 111 is oxidized on the surface of the first electrode 210. Accordingly, electrons are released to the outside of the flow battery from the first electrode 210.

For example, the following reaction occurs in this operation example.

$$DAB \rightarrow DAB^+ + e^-$$

The first circulator 510 causes the first electrode mediator 111 oxidized by the first electrode 210 to be moved to the location where the first active material 310 is disposed. That is, the first circulator 510 causes the first electrode mediator 111 oxidized by the first electrode 210 to be supplied to the location where the first active material 310 is disposed.

The first electrode mediator 111 oxidized on the first electrode 210 is then reduced by the first active material 310. That is, the first active material 310 is oxidized by the first electrode mediator 111. Accordingly, the first active material 310 releases lithium ions.

For example, the following reaction occurs in this operation example.

$$LiCoO_2 + DAB^+ \rightarrow CoO_2 + Li^+ + DAB$$

The first circulator 510 causes the first electrode mediator 111 reduced by the first active material 310 to be moved to the location where the first electrode 210 is disposed. That is, the first circulator 510 causes the first electrode mediator 111 reduced by the first active material 310 to be supplied to the location where the first electrode 210 is disposed.

The first electrode mediator 111 is then oxidized on the surface of the first electrode 210.

For example, the following reaction occurs in this operation example.

$$DAB \rightarrow DAB^+ + e^-$$

Some of the lithium ions (Li$^+$) produced from the first active material 310 can move to the second electrode 220 side through the separator 400.

As described above, when the reactions, including the circulation, are considered as a whole, the first electrode mediator 111 is unchanged.

On the other hand, the first active material 310, which is positioned at a location away from the first electrode 210, is changed to a charged state.

As described above, on the first electrode 210 side, DAB$^+$ performs the function of a charge mediator as a first-electrode-side charge mediator.

In a fully charged state, DAB⁺ is present in the first liquid 110, and the first active material 310 is $CoO_2$. In this case, the charge potential is determined by the oxidation potential for forming DAB⁺.

The charge reactions described above can proceed until the first active material 310 reaches a fully charged state or the second electrode 220 reaches a fully charged state.

Description of Discharging Process

Next, discharge reactions from a full charge will be described.

In the full charge, the first active material 310 and the second electrode 220 are in a charged state.

In the discharge reactions, electrical power is extracted from between the first electrode 210 and the second electrode 220.

Reaction on Negative Electrode Side

An oxidation reaction occurs at the second electrode 220, which is the negative electrode. That is, the negative electrode is placed in a discharge mode.

Accordingly, electrons are released to the outside of the flow battery from the second electrode 220.

For example, the following reaction occurs in this operation example.

$$Li \rightarrow Li^+ + e^-$$

Reaction on Positive Electrode Side

Upon discharging of the battery, electrons are supplied to the first electrode 210, which is the positive electrode, from outside of the flow battery.

Accordingly, a reduction reaction of the first electrode mediator 111 occurs on the first electrode 210.

That is, the first electrode mediator 111 is reduced on the surface of the first electrode 210.

For example, the following reaction occurs in this operation example.

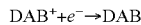

$$DAB^+ + e^- \rightarrow DAB$$

The first circulator 510 causes the first electrode mediator 111 reduced by the first electrode 210 to be moved to the location where the first active material 310 is disposed. That is, the first circulator 510 causes the first electrode mediator 111 reduced by the first electrode 210 to be supplied to the location where the first active material 310 is disposed.

The first electrode mediator 111 reduced on the first electrode 210 is then oxidized by the first active material 310. That is, the first active material 310 is reduced by the first electrode mediator 111. Accordingly, the first active material 310 occludes lithium.

For example, the following reaction occurs in this operation example.

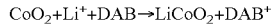

$$CoO_2 + Li^+ + DAB \rightarrow LiCoO_2 + DAB^+$$

The first circulator 510 causes the first electrode mediator 111 oxidized by the first active material 310 to be moved to the location where the first electrode 210 is disposed. That is, the first circulator 510 causes the first electrode mediator 111 oxidized by the first active material 310 to be supplied to the location where the first electrode 210 is disposed.

The first electrode mediator 111 is then reduced on the surface of the first electrode 210.

For example, the following reaction occurs in this operation example.

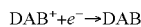

$$DAB^+ + e^- \rightarrow DAB$$

Some of the lithium ions (Li⁺) can be supplied from the second electrode 220 side through the separator 400.

As described above, when the reactions, including the circulation, are considered as a whole, the first electrode mediator 111 is unchanged.

On the other hand, the first active material 310, which is positioned at a location away from the first electrode 210, is changed to a discharged state.

As described above, on the first electrode 210 side, DAB performs the function of a discharge mediator as a first-electrode-side discharge mediator.

In a fully discharged state, DAB is present in the first liquid 110, and the first active material 310 is $LiCoO_2$. In this case, the discharge potential is determined by the reduction potential for forming DAB.

The discharge reactions described above can proceed until the first active material 310 reaches a fully discharged state or the second electrode 220 reaches a fully discharged state.

Second Embodiment

The second embodiment will now be described. Descriptions redundant with those of the first embodiment described above will be omitted where appropriate.

Figure 2:
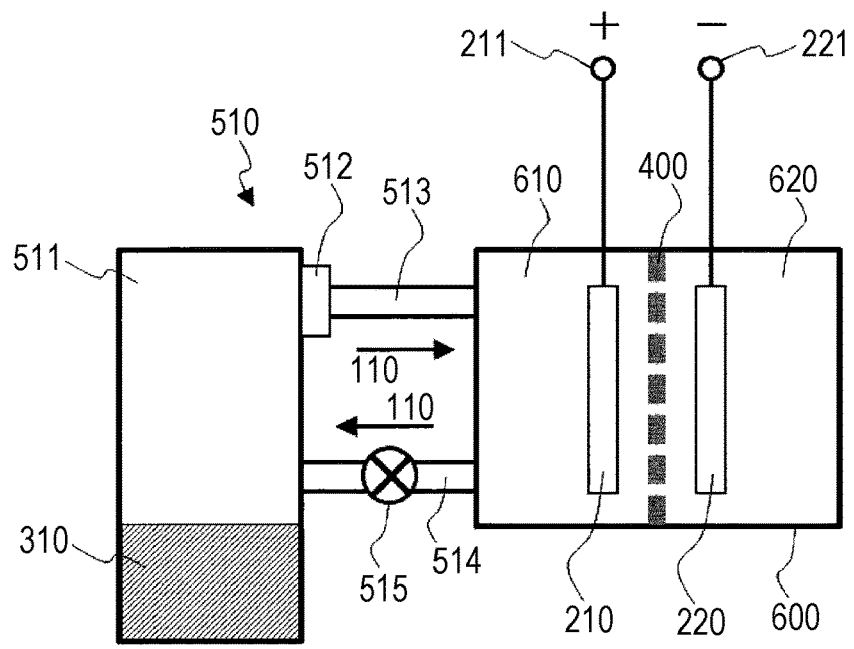
FIG. 2 is a schematic diagram illustrating a general configuration of a flow battery of a second embodiment.

FIG. 2 is a schematic diagram illustrating, by way of example, a general configuration of a flow battery 2000 of the second embodiment.

The flow battery 2000 of the second embodiment includes the following constituents, in addition to the constituents of the above-described flow battery 1000 of the first embodiment.

In the flow battery 2000 of the second embodiment, the first circulator 510 includes a first container 511.

The first active material 310 and the first liquid 110 are stored in the first container 511.

The first circulator 510 circulates the first liquid 110 between the first electrode 210 and the first container 511.

Contact of the first liquid 110 with the first active material 310 in the first container 511 causes at least one of an oxidation reaction and a reduction reaction of the first electrode mediator 111 due to the first active material 310.

In the configuration described above, contact of the first liquid 110 with the first active material 310 is achieved in the first container 511. Thus, for example, the area of contact between the first liquid 110 and the first active material 310 is further increased. Furthermore, the time period in which the first liquid 110 is in contact with the first active material 310 is further increased. Hence, the oxidation reaction and the reduction reaction of the first electrode mediator 111 due to the first active material 310 can be carried out more efficiently.

In the second embodiment, the first container 511 may be a tank, for example.

Furthermore, for example, the first liquid 110, in which the first electrode mediator 111 is dissolved, may be stored in gaps of the first active material 310, which is placed in the first container 511.

Furthermore, as illustrated in FIG. 2, the flow battery 2000 of the second embodiment may further include an electrochemical reaction section 600, a positive electrode terminal 211, and a negative electrode terminal 221.

The electrochemical reaction section 600 is divided by the separator 400 into a positive electrode chamber 610 and a negative electrode chamber 620.

An electrode that serves as the positive electrode is disposed in the positive electrode chamber 610. In FIG. 2, the first electrode 210 is disposed in the positive electrode chamber 610.

The positive electrode terminal 211 is connected to the electrode that serves as the positive electrode.

An electrode that serves as the negative electrode is disposed in the negative electrode chamber 620. In FIG. 2, the second electrode 220 is disposed in the negative electrode chamber 620.

The negative electrode terminal 221 is connected to the electrode that serves as the negative electrode.

The positive electrode terminal 211 and the negative electrode terminal 221 are connected to a charging and discharging device, for example. The charging and discharging device applies a voltage between the positive electrode terminal 211 and the negative electrode terminal 221 or extracts electrical power from between the positive electrode terminal 211 and the negative electrode terminal 221.

Furthermore, as illustrated in FIG. 2, in the flow battery 2000 of the second embodiment, the first circulator 510 may include a conduit 513, a conduit 514 and a pump 515.

One end of the conduit 513 is connected to a first liquid 110 outlet port of the first container 511.

The other end of the conduit 513 is connected to the positive electrode chamber 610 or the negative electrode chamber 620, whichever includes the first electrode 210 disposed therein. In FIG. 2, the other end of the conduit 513 is connected to the positive electrode chamber 610.

One end of the conduit 514 is connected to the positive electrode chamber 610 or the negative electrode chamber 620, whichever includes the first electrode 210 disposed therein. In FIG. 2, the one end of the conduit 514 is connected to the positive electrode chamber 610.

The other end of the conduit 514 is connected to a first liquid 110 inlet port of the first container 511.

The pump 515 is disposed in the conduit 514, for example. Alternatively, the pump 515 may be disposed in the conduit 513.

In the flow battery 2000 of the second embodiment, the first circulator 510 may also include a first passage-inhibiting member 512.

The first passage-inhibiting member 512 inhibits passage of the first active material 310.

The first passage-inhibiting member 512 is disposed in a path along which the first liquid 110 flows from the first container 511 to the first electrode 210. In FIG. 2, the first passage-inhibiting member 512 is disposed in the conduit 513.

The configuration described above inhibits the first active material 310 from flowing out of the first container 511 (e.g., to the first electrode 210 side). That is, the first active material 310 is retained in the first container 511. Thus, a flow battery with a configuration in which the first active material 310 itself is not circulated is realized. Hence, the first active material 310 is prevented from clogging the interior of a member of the first circulator 510. The member of the first circulator 510 may be a conduit, for example. Furthermore, resistance losses that may occur when the first active material 310 flows out to the first electrode 210 side are prevented.

The first passage-inhibiting member 512 may be disposed at the joint between the first container 511 and the conduit 513, for example.

The first passage-inhibiting member 512 may be, for example, a filter for filtering out the first active material 310. In this case, the filter may be a member having pores whose diameter is smaller than the minimum particle diameter of the particles of the first active material 310. The material of the filter may be a material that does not react with the first active material 310, the first liquid 110, or the like. The filter may be made of, for example, glass fiber filter paper, a polypropylene nonwoven fabric, a polyethylene nonwoven fabric, a metal mesh that does not react with lithium metal, or the like.

The configuration described above prevents the first active material 310 from flowing out of the first container 511 even when a flow of the first active material 310 occurs with the flow of the first liquid 110 within the first container 511.

In FIG. 2, the first liquid 110 stored in the first container 511 flows through the first passage-inhibiting member 512 and the conduit 513 and is supplied to the positive electrode chamber 610.

Accordingly, the first electrode mediator 111, which is dissolved in the first liquid 110, is oxidized or reduced by the first electrode 210.

Subsequently, the first liquid 110, in which the oxidized or reduced first electrode mediator 111 is dissolved, passes through the conduit 514 and the pump 515 and is supplied to the first container 511.

Accordingly, for the first electrode mediator 111 dissolved in the first liquid 110, at least one of an oxidation reaction and a reduction reaction of the first electrode mediator 111 due to the first active material 310 takes place.

The circulation of the first liquid 110 may be controlled by the pump 515, for example. That is, the pump 515 is used appropriately to start the supply of the first liquid 110, stop the supply, or adjust the amount of supply or the like.

The circulation of the first liquid 110 may be controlled by a member different from the pump 515. The different member may be, for example, a valve or the like.

In FIG. 2, which illustrates an example, the first electrode 210 is a positive electrode, and the second electrode 220 is a negative electrode.

Note that the first electrode 210 can be a negative electrode when an electrode having a relatively high potential is used as the second electrode 220.

That is, the first electrode 210 may be a negative electrode, and the second electrode 220 may be a positive electrode.

The electrolyte solutions and/or solvents used in the positive electrode chamber 610 and the negative electrode chamber 620, which are separated by the separator 400, may be different from each other in composition.

The electrolyte solutions and/or solvents used in the positive electrode chamber 610 and the negative electrode chamber 620 may have the same composition.

Third Embodiment

A third embodiment will now be described. Descriptions redundant with those of the first embodiment and the second embodiment described above will be omitted where appropriate.

The third embodiment described below has a configuration in which an electrolyte solution is circulated both on the first electrode side and on the second electrode side.

Figure 3:
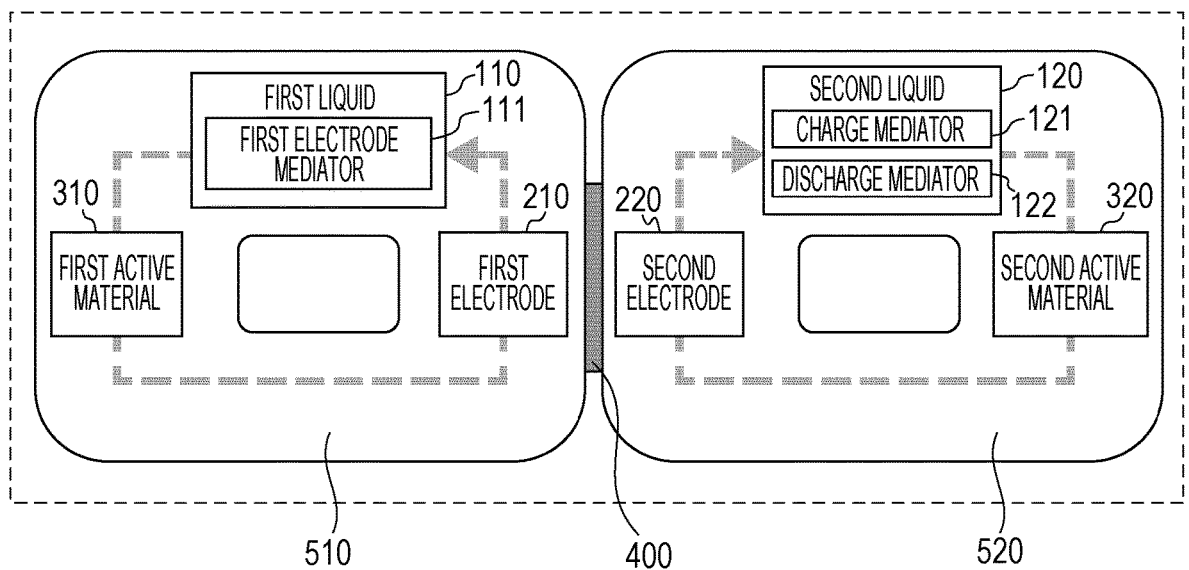
FIG. 3 is a block diagram illustrating a general configuration of a flow battery of a third embodiment.

FIG. 3 is a block diagram illustrating, by way of example, a general configuration of a flow battery 3000 of the third embodiment.

The flow battery 3000 of the third embodiment includes the following constituents, in addition to the constituents of the above-described flow battery 1000 of the first embodiment.

Specifically, the flow battery 3000 of the third embodiment further includes a second liquid 120, the second electrode 220, a second active material 320, and the separator 400.

The second liquid 120 is a liquid in which a charge mediator 121 and a discharge mediator 122 are dissolved. The charge mediator 121 is a second-electrode-side charge mediator, and the discharge mediator 122 is a second-electrode-side discharge mediator.

The second electrode 220 is an electrode immersed in the second liquid 120.

The second active material 320 is an active material immersed in the second liquid 120.

The separator 400 separates the first electrode 210 and the first liquid 110 from the second electrode 220 and the second liquid 120.

The equilibrium potential of the charge mediator 121 is lower than the equilibrium potential of the second active material 320.

The equilibrium potential of the discharge mediator 122 is higher than the equilibrium potential of the second active material 320.

The configuration described above realizes a flow battery having a higher battery voltage, a higher energy density, and a longer cycle life.

Specifically, in the configuration described above, an active material having a relatively low equilibrium potential (vs. Li/Li$^+$) may be used as the second active material 320, thereby enabling a material having a relatively low equilibrium potential (vs. Li/Li$^+$) to be used as the discharge mediator 122. The material having a relatively low equilibrium potential to be used as the second active material 320 may be graphite, for example. The material having a relatively low equilibrium potential to be used as the discharge mediator 122 may be a condensed aromatic compound, for example. In this case, a flow battery negative electrode having a lower potential is realized. As a result, a flow battery having a higher discharge voltage is realized.

Furthermore, the configuration described above realizes a flow battery with a configuration in which although an active material is utilized, the active material itself is not circulated. Accordingly, for example, a high-capacity powder active material can be used as the second active material 320 for the charge and discharge reactions. Consequently, a high energy density and a high capacity are realized.

Furthermore, the configuration described above makes it possible to circulate, exclusively, the second liquid 120, in which the charge mediator 121 and the discharge mediator 122 are dissolved, without circulating the powder active material itself. As a result, for example, clogging of a conduit or the like due to a powder active material is inhibited from occurring. Hence, a flow battery having a long cycle life is realized.

In the flow battery 3000 of the third embodiment, the second liquid 120 may contain lithium dissolved in the second liquid 120.

The second active material 320 may be a material having the property of occluding and releasing lithium.

During charging of the flow battery 3000, electrons are supplied to the second electrode 220 from outside of the flow battery 3000. During charging of the flow battery 3000, the charge mediator 121 is reduced on the second electrode 220. In addition, during charging of the flow battery 3000, the charge mediator 121 reduced on the second electrode 220 may be oxidized by the second active material 320, and the second active material 320 may occlude lithium.

During discharging of the flow battery 3000, electrons are released to the outside of the flow battery 3000 from the second electrode 220. During discharging of the flow battery 3000, the second active material 320, which contains lithium occluded in the second active material 321, reduces the discharge mediator 122, and the second active material 320 releases lithium. In addition, during discharging of the flow battery 3000, the discharge mediator 122 reduced by the second active material 320 may be oxidized on the second electrode 220.

In the configuration described above, the second active material 320 can be, for example, an active material having the property of reversibly occluding and releasing lithium and/or lithium ions. This further facilitates the materials design for the second active material 320. Furthermore, a higher capacity is realized.

Furthermore, during charging of the flow battery 3000 of the third embodiment, the discharge mediator 122 may be reduced on the second electrode 220.

Furthermore, during discharging, the charge mediator 121 may be oxidized on the second electrode 220.

The configuration described above realizes a higher energy density and a higher capacity. That is, the discharge mediator 122 can be reduced by the second electrode 220 during charging, and accordingly, the amount of the discharge mediator 122 that can be oxidized by the second electrode 220 during discharging can be increased. In addition, the charge mediator 121 can be oxidized by the second electrode 220 during discharging, and accordingly, the amount of the charge mediator 121 that can be reduced by the second electrode 220 during charging can be increased. As a result, the charge and discharge capacity can be increased.

In the flow battery 3000 of the third embodiment, the charge mediator 121 and the discharge mediator 122 may include condensed aromatic compounds.

When the second liquid 120 contains a condensed aromatic compound dissolved therein, the second liquid 120 has a property that allows electrons of lithium that are to be solvated to be released into the second liquid 120 and allows lithium to be dissolved as cations in the second liquid 120.

With the configuration described above, a charge mediator 121 and a discharge mediator 122 that have an electrochemically less noble property are realized. A solution containing a condensed aromatic compound is capable of dissolving lithium, for example. The condensed aromatic compound-containing solution may be an ether solution, for example. Lithium easily loses electrons to form cations. As such, lithium donates electrons to the condensed aromatic compound present in the solution and forms cations to be dissolved in the solution. The condensed aromatic compound accepts the electrons and solvates the electrons. The condensed aromatic compound solvating the electrons behaves as anions. Thus, the condensed aromatic compound-containing solution itself has ionic conductivity. Note that the Li cations and the electrons are present in equivalent amounts in the condensed aromatic compound-containing solution. Thus, the condensed aromatic compound-containing solution itself can have a highly reducing property, in other words, an electrochemically less noble property.

For example, when an electrode that does not react with lithium is immersed in the second liquid 120, in which a condensed aromatic compound is dissolved, and the potential is measured versus lithium metal, a significantly less noble potential is observed. The potential to be observed depends on the degree of solvation between the condensed aromatic compound and the electrons, that is, the type of condensed aromatic compound. Examples of condensed aromatic compounds that exhibit a less noble potential include phenanthrene, biphenyl, o-terphenyl, triphenylene, anthracene, phenanthroline, 2,2'-bipyridyl, benzophenone, trans-stilbene, 4,4'-bipyridyl, 3,3'-bipyridyl, 2,4'-bipyridyl, 2,3'-bipyridyl, and cis-stilbene. In place of a condensed aromatic compound, acetophenone, propiophenone, butyrophenone, valerophenone, ethylenediamine, or the like may be used.

In the flow battery 3000 of the third embodiment, the charge mediator 121 may include at least one selected from the group consisting of phenanthrene, biphenyl, o-terphenyl, triphenylene, and anthracene.

The configuration described above realizes a charge mediator 121 having an electrochemically less noble property. More specifically, a charge mediator that exhibits a potential (vs. Li/Li$^+$) less noble than the potentials (vs. Li/Li$^+$) of particular second active materials 320 is realized. The second active material 320 may be graphite, for example.

In the flow battery 3000 of the third embodiment, the discharge mediator 122 may include at least one selected from the group consisting of phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, and ethylenediamine.

The configuration described above realizes a discharge mediator 122 having an electrochemically noble property. More specifically, a discharge mediator 122 that exhibits a potential (vs. Li/Li$^+$) more noble than the potentials (vs. Li/Li$^+$) of particular second active materials 320 is realized. The second active material 320 may be graphite, for example.

In the flow battery 3000 of the third embodiment, the discharge mediator 122 may include at least one selected from the group consisting of 2,2'-bipyridyl, trans-stilbene, 2,4'-bipyridyl, 2,3'-bipyridyl, cis-stilbene, propiophenone, butyrophenone, valerophenone, and ethylenediamine.

With the configuration described above, the discharge mediator 122 has a relatively low equilibrium potential (vs. Li/Li$^+$). In this case, a flow battery negative electrode having a lower potential is realized. As a result, a flow battery having a higher discharge voltage is realized.

In the flow battery 3000 of the third embodiment, the second liquid 120 may be an ether solution.

The configuration described above realizes, for use as the second liquid 120, an electrolyte solution that contains the charge mediator 121 and the discharge mediator 122. That is, since the solvent for the charge mediator 121 and the discharge mediator 122 is an ether solution that has no electron conductivity, the ether solution itself can have properties of an electrolyte solution.

Examples of ethers that may be used include tetrahydrofuran (THF), 2-methyltetrahydrofuran (2MeTHF), dimethoxyethane (DME), 1,3-dioxane (1,3DO), and 4-methyl-1,3-dioxane (4Me1,3DO).

In the flow battery 3000 of the third embodiment, the second active material 320 may be graphite.

With the configuration described above, the second active material 320 has a relatively low equilibrium potential (vs. Li/Li$^+$). Accordingly, a material having a relatively low equilibrium potential (vs. Li/Li$^+$) can be used as the discharge mediator 122. The material having a relatively low equilibrium potential that can be used as the discharge mediator 122 may be a condensed aromatic compound, for example. In this case, a flow battery negative electrode having a lower potential is realized. As a result, a flow battery having a higher discharge voltage is realized.

In the third embodiment, the second active material 320 may be graphite containing lithium occluded therein, that is, a graphite intercalation compound produced during charging, and the composition of the graphite intercalation compound may be at least one of the following: $C_{24}Li$, $C_{18}Li$, $C_{12}Li$, and $C_6Li$.

In the case where the second active material 320 is graphite ($C_6Li$), graphite reacts with lithium and is fully reduced to complete charging. That is, graphite occludes lithium to form $C_6Li$. In this case, the potential of $C_6Li$ is approximately 0.2 V vs. Li/Li$^+$. Accordingly, a mediator-type negative electrode can be formed by using, as a charge mediator, a condensed aromatic compound that exhibits a potential less noble than the potential of $C_6Li$ and using, as a discharge mediator, a condensed aromatic compound that exhibits a potential more noble than the potential of $C_6Li$.

Table 2 shows the potentials of compounds that may be used as the charge mediator 121.

TABLE 2

| Compound | Molar concentration (M) | Potential (V vs. Li/Li$^+$) |
| --- | --- | --- |
| Phenanthrene | 1 | 0.03 |
| Biphenyl | 1 | 0 |
| o-Terphenyl | 1 | 0.15 |
| Triphenylene | 0.1 | 0.01 |
| Anthracene | 0.1 | 0.05 |

Table 3 shows the potentials of compounds that may be used as the discharge mediator 122.

TABLE 3

| Compound | Molar concentration (M) | Potential (V vs. Li/Li$^+$) |
| --- | --- | --- |
| 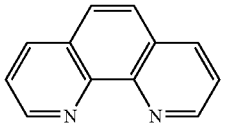<br>Phenanthroline | 0.1 | 1.78 |
| 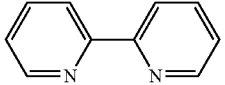<br>2,2'-bipyridyl | 1 | 0.4 |
| 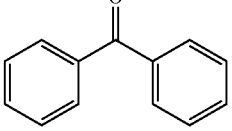<br>Benzophenone | 1 | 0.78 |
| 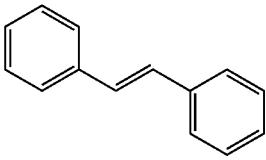<br>trans-Stilbene | 0.5 | 0.3 |
| 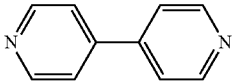<br>4,4'-Bipyridyl | 0.1 | 1.22 |
| 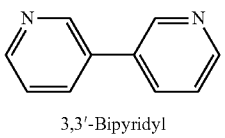 [SMILES: c1cncc(-c2cccnc2)c1]<br>3,3'-Bipyridyl | 0.1 | 2.5 |
| 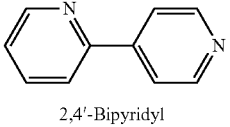<br>2,4'-Bipyridyl | 0.1 | 0.54 |
| 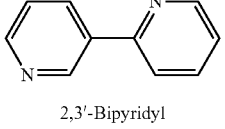<br>2,3'-Bipyridyl | 0.1 | 0.58 |
| 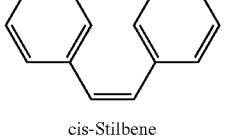<br>cis-Stilbene | 0.1 | 0.43 |
| 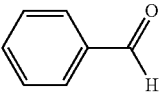<br>Acetophenone | 0.1 | 1.29 |
| 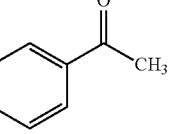<br>Propiophenone | 0.1 | 0.42 |
| 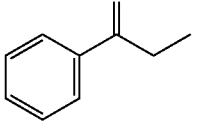<br>Butyrophenone | 0.1 | 0.3 |
| 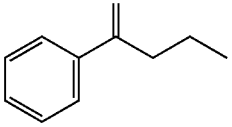<br>Valerophenone | 0.1 | 0.31 |
| 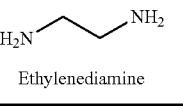<br>Ethylenediamine | 0.1 | 0.36 |

A 2×2 cm copper foil is wrapped with a polypropylene microporous separator, and the resultant is entirely wrapped with a large amount of lithium metal foil. A tab is attached to the copper foil and to the lithium metal. Thereafter, a laminated package is attached to the resultant. The compounds are each dissolved in 2MeTHF at a molar concentration (M) shown in Table 2 or Table 3, and the solution is poured into the laminated package. Thereafter, the laminated package is hermetically heat-sealed. In this manner, a potential measurement cell is prepared for each of the compounds. Table 2 and Table 3 show potentials (V vs. Li/Li$^+$) that are measured versus lithium metal by using the potential measurement cells. In this measurement, 2MeTHF can be used as the ether, but a different ether can be similarly used.

The charge mediator 121 is incapable of dissolving Li present in C$_6$Li. On the other hand, the discharge mediator 122 is capable of dissolving Li present in C$_6$Li. The difference in ability can be explained on the basis of the difference between the potential of C$_6$Li and the potentials of the lithium metal solutions. That is, solutions having a potential more noble than the potential of C$_6$Li (approximately 0.2 V vs. Li/Li$^+$) are capable of dissolving Li present in C$_6$Li. On the other hand, solutions having a potential less noble than the potential of C$_6$Li are incapable of dissolving Li present in C$_6$Li.

Hence, compounds having a potential less noble than the potential of C$_6$Li can be used as the charge mediator 121. Furthermore, compounds having a potential more noble than the potential of C$_6$Li can be used as the discharge mediator 122.

Note that a smaller potential difference between the compound and the second active material 320 results in a higher charge and discharge energy efficiency. Hence, in the case where graphite ($C_6Li$) is used as the second active material 320, phenanthrene, triphenylene, or biphenyl may be used as the charge mediator 121. Furthermore, trans-stilbene, butyrophenone, valerophenone, or ethylenediamine may be used as the discharge mediator 122. In this case, the charge and discharge energy efficiency can be further increased.

The ether to be used may be an ether that is not to be co-intercalated with Li ions into graphite. In this case, since no co-intercalation of an ether into graphite occurs, a capacity density can be further increased.

The second active material 320 may be a solid active material. The solid active material may be an active material in the form of a powder, for example. In the case where the second active material 320 is filled into a tank in the form of a powder without being processed, the manufacturing can be simplified, and the manufacturing cost can be reduced.

The second active material 320 may be an active material in the form of pellets. The active material in the form of pellets may be an active material formed by pelletizing a powder, for example. In the case where the second active material 320 is filled into a tank in the form of pellets, the manufacturing can be simplified, and the manufacturing cost can be reduced.

The second active material 320 may be an active material in the form of pellets bound with a known binder. The binder may be, for example, polyvinylidene fluoride, polypropylene, polyethylene, polyimide, or the like.

The second active material 320 may be a material insoluble in the second liquid 120. This realizes a flow battery with a configuration in which the charge mediator 121 and the discharge mediator 122 are circulated with the second liquid 120 without circulating the second active material 320.

In the flow battery 3000 of the third embodiment, the second electrode 220 may be a negative electrode, and the first electrode 210 may be a positive electrode.

The second electrode 220 side can be a positive electrode when an electrode structure having a relatively low potential is used as the first electrode 210 side.

That is, the second electrode 220 may be a positive electrode, and the first electrode 210 may be a negative electrode.

In the flow battery 3000 of the third embodiment, for example, contact of the second liquid 120 with the second electrode 220 causes the charge mediator 121 and the discharge mediator 122 to be oxidized or reduced by the second electrode 220. That is, for example, contact of the second liquid 120 with the second active material 320 causes a reduction reaction of the discharge mediator 122 due to the second active material 320 or an oxidation reaction of the charge mediator 121 due to the second active material 320.

The second electrode 220 may be an electrode having a surface that serves as a reaction site for the charge mediator 121 and the discharge mediator 122.

In this case, a material stable in the second liquid 120 can be used for the second electrode 220. The material stable in the second liquid 120 may be a material insoluble in the second liquid 120. In addition, the material of the second electrode 220 may be stable in the electrochemical reactions that are electrode reactions. For example, a metal, carbon, or the like can be used for the second electrode 220. The metal may be, for example, stainless steel, iron, copper, nickel, or the like.

The second electrode 220 may have a structure with an increased surface area. The electrode having a structure with an increased surface area may be, for example, an electrode made of a mesh material, a nonwoven fabric, a surface-roughened sheet, a sintered porous body, or the like. In this case, the second electrode 220 has a high specific surface area. As a result, the progress of the oxidation reaction or the reduction reaction of the charge mediator 121 and the discharge mediator 122 can be further facilitated.

The flow battery 3000 of the third embodiment may further include a second circulator 520.

The second circulator 520 is a mechanism that circulates the second liquid 120 between the second electrode 220 and the second active material 320.

With the configuration described above, the charge mediator 121 and the discharge mediator 122 can be circulated with the second liquid 120 between the second electrode 220 and the second active material 320. This enables the oxidation reaction and the reduction reaction between the materials to be carried out more efficiently.

The second circulator 520 may be a mechanism including, for example, a conduit, a tank, a pump, a valve, and the like.

As a specific example of the second circulator 520, the configuration of a later-described fourth embodiment, for example, may be mentioned.

Description of Charging and Discharging Processes

Charging and discharging processes for the flow battery 3000 of the third embodiment will be described below.

The charging and discharging processes will be described by specifically exemplifying an operation example, which is configured as described below.

In this operation example, the first electrode 210 is a positive electrode and a carbon black electrode.

In this operation example, the first liquid 110 is an ether solution in which the first electrode mediator 111 is dissolved.

In this operation example, the first electrode mediator 111 includes the above-described benzene derivative (hereinafter referred to as "DAB (dialkoxybenzene)") of the first embodiment.

In this operation example, the first active material 310 is lithium cobalt oxide ($LiCoO_2$).

In this operation example, the second electrode 220 is a negative electrode and a stainless steel electrode.

In this operation example, the second liquid 120 is an ether solution in which the charge mediator 121 and the discharge mediator 122 are dissolved.

In this operation example, the charge mediator 121 on the second electrode 220 side is a type of compound (hereinafter referred to as "ChMd").

In this operation example, the discharge mediator 122 on the second electrode 220 side is a type of compound (hereinafter referred to as "DchMd").

In this operation example, the second active material 320 is graphite ($C_6Li$).

In this operation example, the separator 400 is a lithium-ion-conductive solid electrolyte membrane.

Description of Charging Process

First, charge reactions will be described.

Charging takes place upon application of a voltage between the first electrode 210 and the second electrode 220.

Reactions on Negative Electrode Side

Upon application of a voltage, electrons are supplied to the second electrode 220, which is the negative electrode, from outside of the flow battery. Accordingly, reduction reactions of the charge mediator 121 and the discharge mediator 122 occur on the second electrode 220.

For example, the following reactions occur in this operation example.

$$ChMd+Li^{+}+e^{-} \rightarrow ChMd.Li$$

$$DchMd+Li^{+}+e^{-} \rightarrow DchMd.Li$$

The second circulator 520 causes the charge mediator 121 reduced by the second electrode 220 to be moved to the location where the second active material 320 is disposed. That is, the second circulator 520 causes the charge mediator 121 reduced by the second electrode 220 to be supplied to the location where the second active material 320 is disposed.

The charge mediator 121 reduced on the second electrode 220 is then oxidized by the second active material 320. That is, the second active material 320 is reduced by the charge mediator 121. Accordingly, the second active material 320 occludes lithium to form $C_6Li$.

For example, the following reaction occurs in this operation example.

$$6C+ChMd.Li \rightarrow C_6Li+ChMd$$

The second circulator 520 causes the charge mediator 121 oxidized by the second active material 320 to be moved to the location where the second electrode 220 is disposed. That is, the second circulator 520 causes the charge mediator 121 oxidized by the second active material 320 to be supplied to the location where the second electrode 220 is disposed.

As described above, when the reactions, including the circulation, are considered as a whole, the charge mediator 121 is unchanged.

On the other hand, the second active material 320, which is positioned at a location away from the second electrode 220, is changed to a charged state.

Reaction on Positive Electrode Side

Upon application of a voltage, an oxidation reaction of the first electrode mediator 111 occurs at the first electrode 210, which is the positive electrode. That is, the first electrode mediator 111 is oxidized on the surface of the first electrode 210. Accordingly, electrons are released to the outside of the flow battery from the first electrode 210.

For example, the following reaction occurs in this operation example.

$$DAB \rightarrow DAB^{+}+e^{-}$$

The first circulator 510 causes the first electrode mediator 111 oxidized by the first electrode 210 to be moved to the location where the first active material 310 is disposed. That is, the first circulator 510 causes the first electrode mediator 111 oxidized by the first electrode 210 to be supplied to the location where the first active material 310 is disposed.

The first electrode mediator 111 oxidized on the first electrode 210 is then reduced by the first active material 310. That is, the first active material 310 is oxidized by the first electrode mediator 111. Accordingly, the first active material 310 releases lithium.

For example, the following reaction occurs in this operation example.

$$LiCoO_2+DAB^{+} \rightarrow CoO_2+Li^{+}+DAB$$

The first circulator 510 causes the first electrode mediator 111 reduced by the first active material 310 to be moved to the location where the first electrode 210 is disposed. That is, the first circulator 510 causes the first electrode mediator 111 reduced by the first active material 310 to be supplied to the location where the first electrode 210 is disposed.

The first electrode mediator 111 is then oxidized on the surface of the first electrode 210.

For example, the following reaction occurs in this operation example.

$$DAB \rightarrow DAB^{+}+e^{-}$$

Some of the lithium ions ($Li^+$) produced can move to the second electrode 220 side through the separator 400.

As described above, when the reactions, including the circulation, are considered as a whole, the first electrode mediator 111 is unchanged.

On the other hand, the first active material 310, which is positioned at a location away from the first electrode 210, is changed to a charged state.

As described above, on the first electrode 210 side, $DAB^+$ performs the function of a charge mediator as a first-electrode-side charge mediator.

In a fully charged state, $DAB^+$ is present in the first liquid 110, and the first active material 310 is $CoO_2$. In this case, the charge potential is determined by the oxidation potential for forming $DAB^+$.

The charge reactions described above can proceed until the first active material 310 reaches a fully charged state or the second active material 320 reaches a fully charged state.

Description of Discharging Process

Next, discharge reactions from a full charge will be described.

In the full charge, the first active material 310 and the second active material 320 are in a charged state.

In the discharge reactions, electrical power is extracted from between the first electrode 210 and the second electrode 220.

Reactions on Negative Electrode Side

Upon discharging of the battery, oxidation reactions of the charge mediator 121 and the discharge mediator 122 occur on the second electrode 220, which is the negative electrode. Accordingly, electrons are released to the outside of the flow battery from the second electrode 220.

For example, the following reactions occur in this operation example.

$$DchMd.Li \rightarrow DchMd+Li^{+}+e^{-}$$

$$ChMd.Li \rightarrow ChMd+Li^{+}+e^{-}$$

The second circulator 520 causes the discharge mediator 122 oxidized by the second electrode 220 to be moved to the location where the second active material 320 is disposed. That is, the second circulator 520 causes the discharge mediator 122 oxidized by the second electrode 220 to be supplied to the location where the second active material 320 is disposed.

The discharge mediator 122 oxidized on the second electrode 220 is then reduced by the second active material 320. That is, the second active material 320 is oxidized by the discharge mediator 122. Accordingly, the second active material 320 releases lithium.

For example, the following reaction occurs in this operation example.

$$C_6Li+DchMd \rightarrow 6C+DchMd.Li$$

The second circulator 520 causes the discharge mediator 122 reduced by the second active material 320 to be moved to the location where the second electrode 220 is disposed. That is, the second circulator 520 causes the discharge mediator 122 reduced by the second active material 320 to be supplied to the location where the second electrode 220 is disposed.

As described above, when the reactions, including the circulation, are considered as a whole, the discharge mediator 122 is unchanged.

On the other hand, the second active material 320, which is positioned at a location away from the second electrode 220, is changed to a discharged state.

Reaction on Positive Electrode Side

Upon discharging of the battery, electrons are supplied to the first electrode 210, which is the positive electrode, from outside of the flow battery. Accordingly, a reduction reaction of the first electrode mediator 111 occurs on the first electrode 210. That is, the first electrode mediator 111 is reduced on the surface of the first electrode 210.

For example, the following reaction occurs in this operation example.

$$DAB^+ + e^- \rightarrow DAB$$

The first circulator 510 causes the first electrode mediator 111 reduced by the first electrode 210 to be moved to the location where the first active material 310 is disposed. That is, the first circulator 510 causes the first electrode mediator 111 reduced by the first electrode 210 to be supplied to the location where the first active material 310 is disposed.

The first electrode mediator 111 reduced on the first electrode 210 is then oxidized by the first active material 310. That is, the first active material 310 is reduced by the first electrode mediator 111. Accordingly, the first active material 310 occludes lithium.

For example, the following reaction occurs in this operation example.

$$CoO_2 + Li^+ + DAB \rightarrow LiCoO_2 + DAB^+$$

The first circulator 510 causes the first electrode mediator 111 oxidized by the first active material 310 to be moved to the location where the first electrode 210 is disposed. That is, the first circulator 510 causes the first electrode mediator 111 oxidized by the first active material 310 to be supplied to the location where the first electrode 210 is disposed.

The first electrode mediator 111 is then reduced on the surface of the first electrode 210.

For example, the following reaction occurs in this operation example.

$$DAB^+ + e^- \rightarrow DAB$$

Some of the lithium ions ($Li^+$) can be supplied from the second electrode 220 side through the separator 400.

As described above, when the reactions, including the circulation, are considered as a whole, the first electrode mediator 111 is unchanged.

On the other hand, the first active material 310, which is positioned at a location away from the first electrode 210, is changed to a discharged state.

As described above, on the first electrode 210 side, DAB performs the function of a discharge mediator as a first-electrode-side discharge mediator.

In a fully discharged state, DAB is present in the first liquid 110, and the first active material 310 is $LiCoO_2$. In this case, the discharge potential is determined by the reduction potential for forming DAB.

The discharge reactions described above can proceed until the first active material 310 reaches a fully discharged state or the second active material 320 reaches a fully discharged state.

Estimation of Energy Density

The results of estimation of the energy density of the flow battery 3000 of the third embodiment will be described below.

Table 4 shows the results of estimation of the energy density of the flow battery 3000 of the third embodiment.

TABLE 4

| Positive electrode charge mediator | 1,4-di-tert-butyl-2,5-dimethoxybenzene | 1,4-dichloro-2,5-dimethoxybenzene | 1,4-difluoro-2,5-dimethoxybenzene | 1,4-dibromo-2,5-dimethoxybenzene | TTF (reference) |
|---|---|---|---|---|---|
| Potential of positive electrode charge mediator (V vs. $Li/Li^+$) | 4.03 | 4.39 | 4.24 | 4.44 | 3.64 |
| Potential of positive electrode discharge mediator (V vs. $Li/Li^+$) | 3.78 | 3.78 | 3.78 | 3.78 | 3.29 |
| Potential of negative electrode charge mediator (V vs. $Li/Li^+$) | 0.03 | 0.03 | 0.03 | 0.03 | 0.03 |
| Potential of negative electrode discharge mediator (V vs. $Li/Li^+$) | 0.30 | 0.30 | 0.30 | 0.30 | 0.3 |
| Charge voltage of flow battery (V) | 4.00 | 4.36 | 4.21 | 4.41 | 3.61 |
| Discharge voltage of flow battery (V) | 3.48 | 3.48 | 3.48 | 3.48 | 2.99 |
| Theoretical capacity density of flow battery (Ah/L) | 837.00 | 837.00 | 837.00 | 837.00 | 353.52 |
| Theoretical energy density of flow battery (Wh/L) | 2912.76 | 2912.76 | 2912.76 | 2912.76 | 1055.95 |
| Volume filling factor of power generation element | 0.60 | 0.60 | 0.60 | 0.60 | 0.6 |
| Energy density of flow battery (Wh/L) | 1747.66 | 1747.66 | 1747.66 | 1747.66 | 633.57 |

Negative electrode: graphite, positive electrode: $LiCoO_2$
Positive electrode charge mediator: benzene derivative substituted with para-positioned alkoxy groups (4.3 to 4.4 V), positive electrode discharge mediator: 1,1'-dibromoferrocene (3.78 V)
Negative electrode charge mediator: phenanthrene (0.03 V), negative electrode discharge mediator: stilbene (0.3 V)
Accordingly, computer calculation was performed
*In case of TTF, $LiFePO_4$ was used as solid positive electrode active material Table 4 shows the results of estimation of the energy density. The estimation is based on the following assumptions: each of the benzene derivatives shown in Table 1 above is used as the charge mediator of the first electrode mediator 111; in the case where the positive electrode charge mediator is a mediator that exhibits a single-step redox reaction, 2,2'-bithiophene or the like is used as the positive electrode discharge mediator; the conditions for the above-described operation example for the flow battery 3000 of the third embodiment are used; the charge mediator 121 is phenanthrene; and the discharge mediator 122 is trans-stilbene. In Table 4, the volume filling factor of the power generation element is expressed as a ratio. For example, "a volume filling factor of the power generation element of 0.60" means 60%.

In Table 4, in the simulation example in which tetrathiafulvalene is used as the first electrode mediator 111, that is, a positive electrode charge mediator, the solid positive electrode active material is LiFePO$_4$, and 1,1'-dibromoferrocene is not used. This is because tetrathiafulvalene (TTF) also serves as a positive electrode discharge mediator.

As shown in Table 4, in the case where 1,4-di-tert-butyl-2,5-dimethoxybenzene or the like is used as the charge mediator of the first electrode mediator 111, and a cyclopentadienyl compound, such as 1,1'-dibromoferrocene, is used as the discharge mediator of the first electrode mediator 111, a flow battery having an energy density of approximately 1747 Wh/L is realized.

In contrast, the theoretical energy density of existing flow batteries utilizing vanadium is approximately 38 Wh/L. This result demonstrates that the theoretical energy density of the flow battery of the present disclosure is much higher than that of existing flow batteries.

Furthermore, as shown in Table 4, in the case where tetrathiafulvalene is used as the first electrode mediator 111, LiFePO$_4$ is used as the solid positive electrode active material, and as a result, the flow battery obtained has an energy density of approximately 633 Wh/L. This result demonstrates that the theoretical energy densities of flow batteries in which a benzene derivative is used are higher than those of flow batteries in which tetrathiafulvalene, a derivative thereof, or the like is used.

Fourth Embodiment

The fourth embodiment will now be described. Descriptions redundant with those of any of the first to third embodiments described above will be omitted where appropriate.

Figure 4:
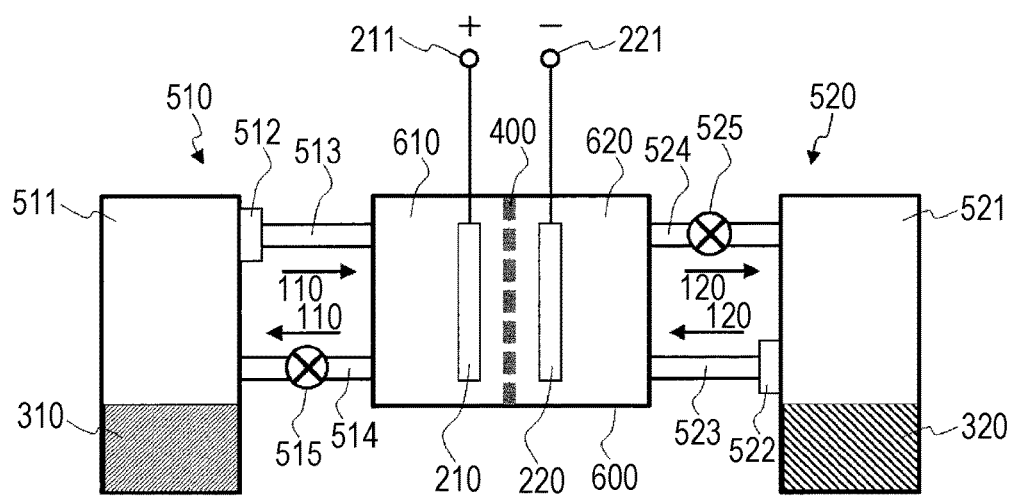
FIG. 4 is a schematic diagram illustrating a general configuration of a flow battery of a fourth embodiment.

FIG. 4 is a schematic diagram illustrating, by way of example, a general configuration of a flow battery 4000 of the fourth embodiment.

The flow battery 4000 of the fourth embodiment includes the following constituents, in addition to the constituents of the above-described flow battery 3000 of the third embodiment.

First, the flow battery 4000 of the fourth embodiment includes the constituents of the first circulator 510, which are presented in the second embodiment described above.

In addition, the flow battery 4000 of the fourth embodiment includes the electrochemical reaction section 600, the positive electrode terminal 211, and the negative electrode terminal 221, which are presented in the second embodiment described above.

In addition, the flow battery 4000 of the fourth embodiment includes the second circulator 520.

The second circulator 520 includes a second container 521.

The second active material 320 and the second liquid 120 are stored in the second container 521.

The second circulator 520 circulates the second liquid 120 between the second electrode 220 and the second container 521.

Contact of the second liquid 120 with the second active material 320 in the second container 521 causes at least one of an oxidation reaction of the charge mediator 121 due to the second active material 320 and a reduction reaction of the discharge mediator 122 due to the second active material 320.

In the configuration described above, contact of the second liquid 120 with the second active material 320 is achieved in the second container 521. Thus, for example, the area of contact between the second liquid 120 and the second active material 320 is further increased. Furthermore, the time period in which the second liquid 120 is in contact with the second active material 320 is further increased. Hence, the oxidation reaction of the charge mediator 121 due to the second active material 320 and the reduction reaction of the discharge mediator 122 due to the second active material 320 can be carried out more efficiently.

In the fourth embodiment, the second container 521 may be a tank, for example.

Furthermore, for example, the second liquid 120, in which the charge mediator 121 and the discharge mediator 122 are dissolved, may be stored in gaps of the second active material 320, which is placed in the second container 521.

Furthermore, as illustrated in FIG. 4, in the flow battery 4000 of the fourth embodiment, the second circulator 520 may include a conduit 523, a conduit 524 and a pump 525.

One end of the conduit 524 is connected to the positive electrode chamber 610 or the negative electrode chamber 620, whichever includes the second electrode 220 disposed therein. In FIG. 4, the one end of the conduit 524 is connected to the negative electrode chamber 620.

The other end of the conduit 524 is connected to a second liquid 120 inlet port of the second container 521.

One end of the conduit 523 is connected to a second liquid 120 outlet port of the second container 521.

The other end of the conduit 523 is connected to the positive electrode chamber 610 or the negative electrode chamber 620, whichever includes the second electrode 220 disposed therein. In FIG. 4, the other end of the conduit 523 is connected to the negative electrode chamber 620.

The pump 525 is disposed in the conduit 524, for example. Alternatively, the pump 525 may be disposed in the conduit 523.

In the flow battery 4000 of the fourth embodiment, the second circulator 520 may also include a second passage-inhibiting member 522.

The second passage-inhibiting member 522 inhibits passage of the second active material 320.

The second passage-inhibiting member 522 is disposed in a path along which the second liquid 120 flows from the second container 521 to the second electrode 220. In FIG. 4, the second passage-inhibiting member 522 is disposed in the conduit 523.

The configuration described above inhibits the second active material 320 from flowing out of the second container 521 (e.g., to the second electrode 220 side). That is, the second active material 320 is retained in the second container 521. Thus, a flow battery with a configuration in which the second active material 320 itself is not circulated is realized. Hence, the second active material 320 is prevented from clogging the interior of a member of the second circulator 520. Furthermore, resistance losses that may occur when the second active material 320 flows out to the second electrode 220 side are prevented. The member of the second circulator 520 may be a conduit, for example.

The second passage-inhibiting member 522 may be disposed at the joint between the second container 521 and the conduit 523, for example.

The second passage-inhibiting member 522 may be, for example, a filter for filtering out the second active material 320. In this case, the filter may be a member having pores whose diameter is smaller than the minimum particle diameter of the particles of the second active material 320. The material of the filter may be a material that does not react with the second active material 320, the second liquid 120, or the like. The filter may be made of, for example, glass fiber filter paper, a polypropylene nonwoven fabric, a polyethylene nonwoven fabric, a metal mesh that does not react with lithium metal, or the like.

The configuration described above prevents the second active material 320 from flowing out of the second container 521 even when a flow of the second active material 320 occurs with the flow of the second liquid 120 within the second container 521.

In FIG. 4, the second liquid 120 stored in the second container 521 flows through the second passage-inhibiting member 522 and the conduit 523 and is supplied to the negative electrode chamber 620.

Accordingly, the charge mediator 121 and the discharge mediator 122, which are dissolved in the second liquid 120, are oxidized or reduced by the second electrode 220.

Subsequently, the second liquid 120, in which the oxidized or reduced charge mediator 121 and discharge mediator 122 are dissolved, passes through the conduit 524 and the pump 525 and is supplied to the second container 521.

Accordingly, for the charge mediator 121 and the discharge mediator 122 dissolved in the second liquid 120, at least one of an oxidation reaction of the charge mediator 121 due to the second active material 320 and a reduction reaction of the discharge mediator 122 due to the second active material 320 takes place.

The circulation of the second liquid 120 may be controlled by the pump 525, for example. That is, the pump 525 is used appropriately to start the supply of the second liquid 120, stop the supply, or adjust the amount of supply or the like.

The circulation of the second liquid 120 may be controlled by a member different from the pump 525. The different member may be, for example, a valve or the like.

In FIG. 4, which illustrates an example, the first electrode 210 is a positive electrode, and the second electrode 220 is a negative electrode.

Note that the second electrode 220 side can be a positive electrode when an electrode structure having a relatively low potential is used as the first electrode 210 side.

That is, the second electrode 220 may be a positive electrode, and the first electrode 210 may be a negative electrode.

Benzene derivatives according to the present disclosure realize flow batteries having a higher discharge potential and a higher energy density than existing flow batteries in which a tetrathiafulvalene derivative, for example, is used as a mediator, and LiFePO$_4$ is used as a solid positive electrode active material.

The configurations described in the above first to fourth embodiments may be appropriately combined with one another.

EXAMPLES

Next, flow batteries according to the present disclosure will be described in more detail with reference to examples, but the present disclosure is in no way limited to the examples.

Examples 1 to 4

An electrolyte solution containing 1 M of an electrolyte dissolved in a solvent was prepared. The electrolyte used was LiBF$_4$. The solvent used was propylene carbonate (PC). In the electrolyte solution, 5 mM of each of the benzene derivatives shown in Table 1 was dissolved. Thus, electrolyte solutions corresponding to the respective benzene derivatives shown in Table 1 were obtained. Potential measurement cells corresponding to the respective benzene derivatives shown in Table 1 were prepared. Each of the cells included a corresponding electrolyte solution, a counter electrode, a working electrode, and a reference electrode. For the counter electrode, a 1×1 cm Pt foil was used. For the working electrode, a glassy carbon electrode (6 mm φ) for electrochemical measurement was used. For the reference electrode, silver wire (Ag/Ag$^+$) was used. By using each of the potential measurement cells, cyclic voltammetry (CV) was conducted. The results are shown in FIG. 5. FIG. 5 confirms that the presence of the lone pairs of alkoxy groups that are attached at para positions relative to each other provides an electron-donating conjugation effect, which stabilizes the benzene derivative cation radicals and therefore enables reversible charging and discharging.

Comparative Examples 1 to 5

Figure 6A:
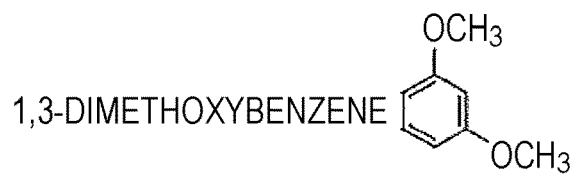
FIG. 6A is a graph illustrating the results of cyclic voltammetry of Comparative Example 1.
Figure 6A:
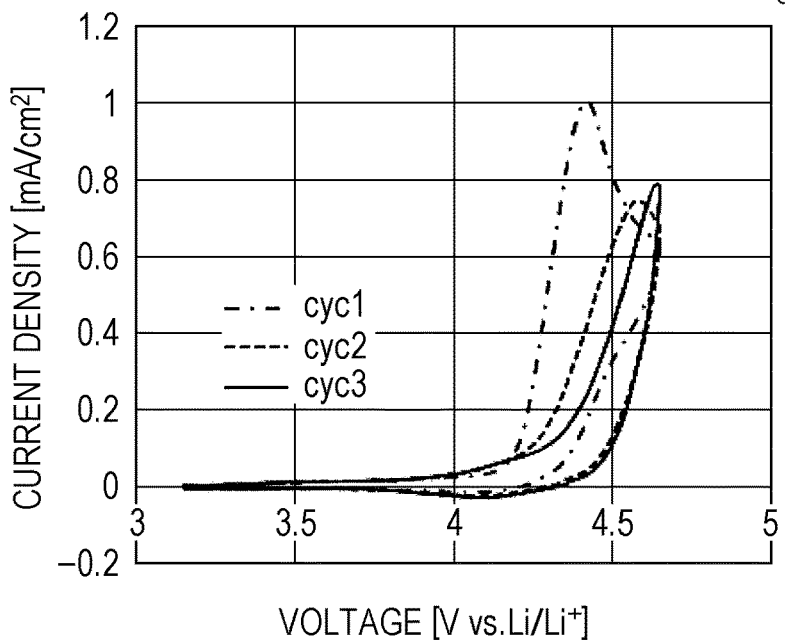
Figure 6B:
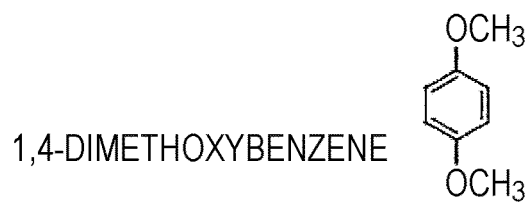
FIG. 6B is a graph illustrating the results of cyclic voltammetry of Comparative Example 2.
Figure 6B:
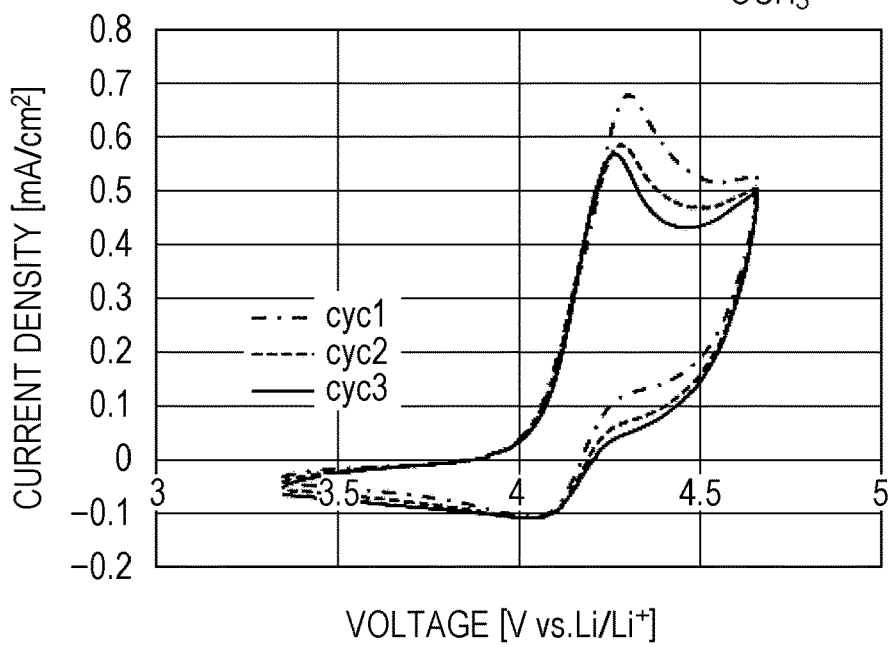
Figure 6C:
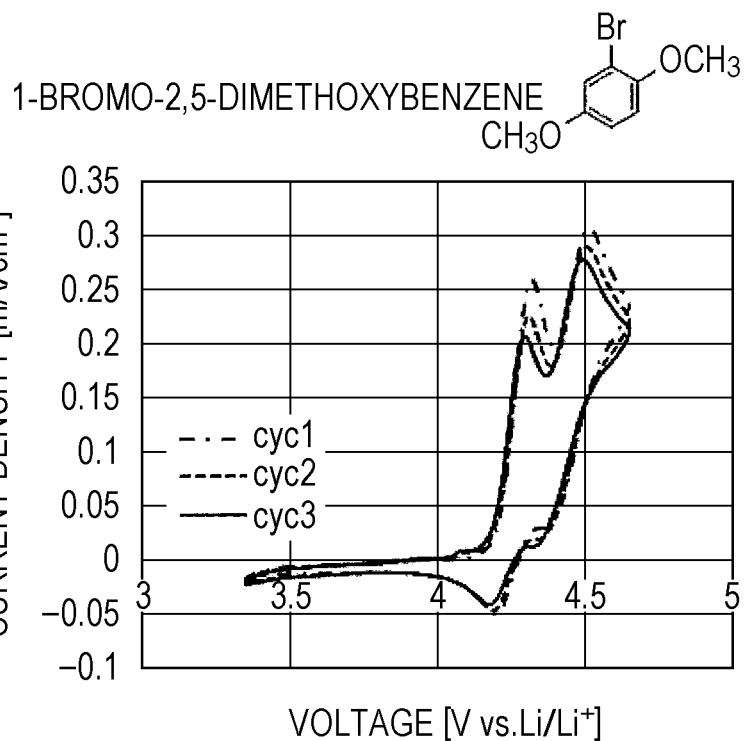
FIG. 6C is a graph illustrating the results of cyclic voltammetry of Comparative Example 3.
Figure 6D:
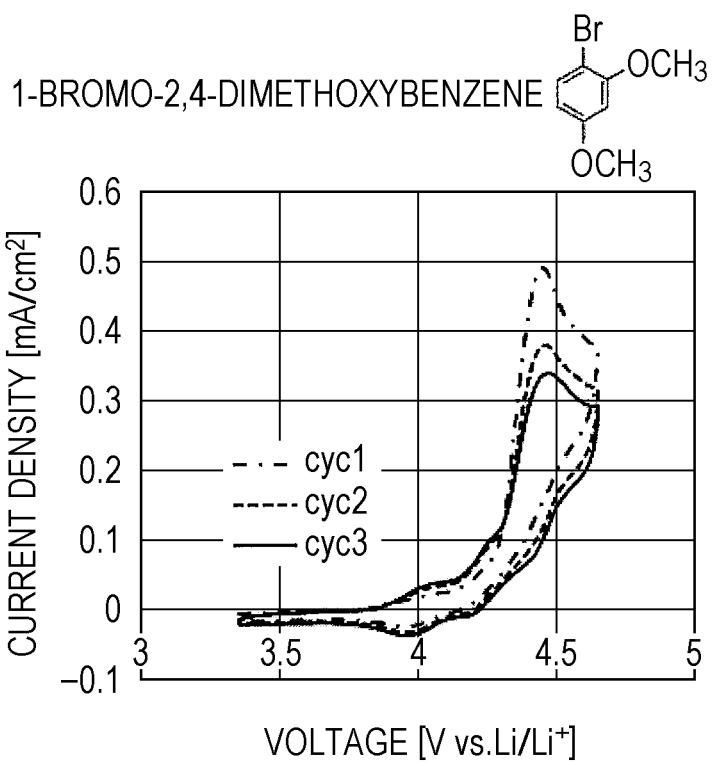
FIG. 6D is a graph illustrating the results of cyclic voltammetry of Comparative Example 4.
Figure 6E:
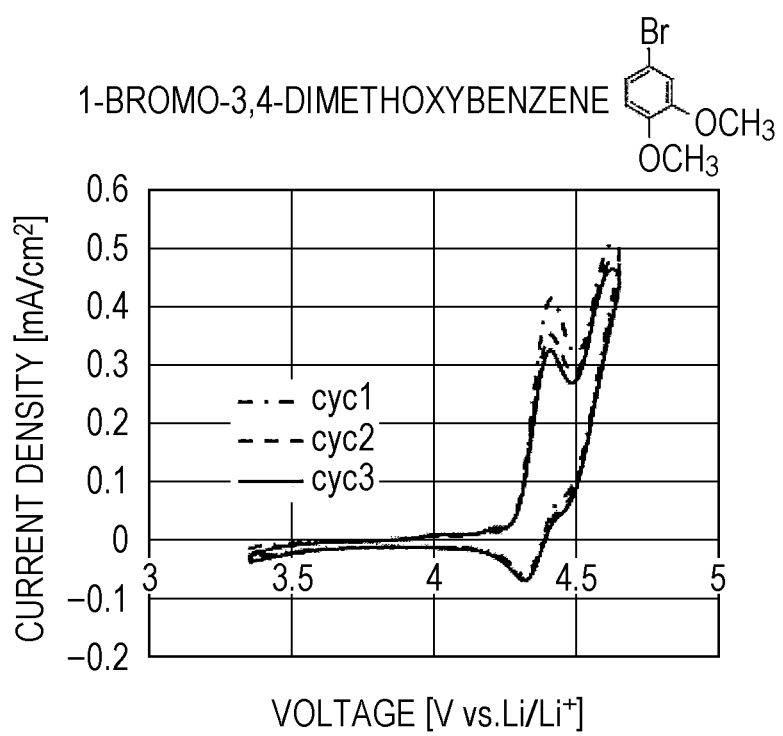
FIG. 6E is a graph illustrating the results of cyclic voltammetry of Comparative Example 5.

In Comparative Example 1, cyclic voltammetry was conducted as in Example 1 except that the compound to be used as the first electrode mediator was changed to 1,3-dimethoxybenzene. The results are shown in FIG. 6A. In Comparative Example 2, cyclic voltammetry was conducted as in Example 1 except that the compound to be used as the first electrode mediator was changed to 1,4-dimethoxybenzene. The results are shown in FIG. 6B. In Comparative Example 3, cyclic voltammetry was conducted as in Example 1 except that the compound to be used as the first electrode mediator was changed to 1-bromo-2,5-dimethoxybenzene. The results are shown in FIG. 6C. In Comparative Example 4, cyclic voltammetry was conducted as in Example 1 except that the compound to be used as the first electrode mediator was changed to 1-bromo-2,4-dimethoxybenzene. The results are shown in FIG. 6D. In Comparative Example 5, cyclic voltammetry was conducted as in Example 1 except that the compound to be used as the first electrode mediator was changed to 1-bromo-3,4-dimethoxybenzene. The results are shown in FIG. 6E.

The flow battery of the present disclosure can be used as, for example, a power storage device or a power storage system.

What is claimed is:

1. A flow battery comprising:
a first liquid containing a first electrode mediator;
a first electrode;
a first active material; and
a first circulator that circulates the first liquid between the first electrode and the first active material,
wherein the first electrode mediator includes at least one benzene derivative that is at least one selected from the group consisting of 1,4-di-tert-butyl-2,5-dimethoxybenzene, 1,4-dichloro-2,5-dimethoxybenzene, 1,4-difluoro-2,5-dimethoxybenzene, and 1,4-dibromo-2,5-dimethoxybenzene.

2. The flow battery according to claim 1, wherein
the at least one benzene derivative has a first redox potential and a second redox potential, and
an equilibrium potential of the first active material is higher than the first redox potential and lower than the second redox potential.

3. The flow battery according to claim 1, wherein
the first liquid further contains a first-electrode-side discharge mediator,
the at least one benzene derivative has an oxidation potential,
an equilibrium potential of the first active material is lower than the oxidation potential of the at least one benzene derivative, and
the equilibrium potential of the first active material is higher than an equilibrium potential of the first-electrode-side discharge mediator.

4. The flow battery according to claim 1, wherein
the first circulator includes a first container,
the first active material and the first liquid are stored in the first container,
the first circulator circulates the first liquid between the first electrode and the first container, and
contact of the first liquid with the first active material in the first container causes at least one selected form the group consisting of (a) an oxidation reaction of the first electrode mediator due to the first active material and (b) a reduction reaction of the first electrode mediator due to the first active material.

5. The flow battery according to claim 1, wherein
the first circulator includes a first passage-inhibiting filter that inhibits passage of the first active material, and
the first passage-inhibiting filter is disposed in a path along which the first liquid flows from the first container to the first electrode.

6. The flow battery according to claim 1, further comprising:
a second liquid containing a charge mediator and a discharge mediator;
a second electrode immersed in the second liquid;
a second active material immersed in the second liquid; and
a separator that separates the first electrode and the first liquid from the second electrode and the second liquid, wherein
an equilibrium potential of the charge mediator is lower than an equilibrium potential of the second active material, and
an equilibrium potential of the discharge mediator is higher than the equilibrium potential of the second active material.

7. The flow battery according to claim 6, wherein
the second liquid contains lithium dissolved in the second liquid,
the second active material is a material having a property of occluding and releasing the lithium,
during charging, the charge mediator is reduced on the second electrode, and the charge mediator reduced on the second electrode is oxidized by the second active material, and the second active material occludes the lithium, and
during discharging, the second active material containing the lithium occluded in the second active material reduces the discharge mediator and releases the lithium, and the discharge mediator reduced by the second active material is oxidized on the second electrode.

8. The flow battery according to claim 6, wherein
during the charging, the discharge mediator is reduced on the second electrode, and
during the discharging, the charge mediator is oxidized on the second electrode.

9. The flow battery according to claim 6, wherein
the charge mediator and the discharge mediator include condensed aromatic compounds, and
the second liquid, in which the condensed aromatic compounds are dissolved, has a property that allows electrons of lithium that are to be solvated to be released into the second liquid and allows the lithium to be dissolved as cations in the second liquid.

10. The flow battery according to claim 6, wherein
the charge mediator includes at least one selected from the group consisting of phenanthrene, biphenyl, o-terphenyl, triphenylene, and anthracene.

11. The flow battery according to claim 6, wherein
the discharge mediator includes at least one selected from the group consisting of phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, and ethylenediamine.

12. The flow battery according to claim 6, further comprising a second circulator including a second container, wherein
the second active material and the second liquid are stored in the second container,
the second circulator circulates the second liquid between the second electrode and the second container, and
contact of the second liquid with the second active material in the second container causes at least one of an oxidation reaction of the charge mediator due to the second active material and a reduction reaction of the discharge mediator due to the second active material.

13. The flow battery according to claim 6, wherein
the second circulator includes a second passage-inhibiting filter that inhibits passage of the second active material, and
the second passage-inhibiting filter is disposed in a path along which the second liquid flows from the second container to the second electrode.

* * * * *